(12) United States Patent
Nagasaka et al.

(10) Patent No.: US 8,160,744 B2
(45) Date of Patent: Apr. 17, 2012

(54) CONTACT SHAPE COMPUTING APPARATUS AND METHOD, AND COMPUTER PROGRAM THEREFOR

(75) Inventors: Kenichiro Nagasaka, Tokyo (JP); Masakuni Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 1246 days.

(21) Appl. No.: 11/528,476

(22) Filed: Sep. 28, 2006

(65) Prior Publication Data

US 2007/0078918 A1 Apr. 5, 2007

(30) Foreign Application Priority Data

Oct. 3, 2005 (JP) ................ P2005-289598

(51) Int. Cl.
*G06F 19/00* (2011.01)
(52) U.S. Cl. .......................... 700/245; 901/1
(58) Field of Classification Search .............. 700/255, 700/245; 703/2
See application file for complete search history.

(56) References Cited

U.S. PATENT DOCUMENTS

| | | | | |
|---|---|---|---|---|
| 5,623,583 A * | 4/1997 | Nishino | ........................ | 345/420 |
| 5,625,575 A * | 4/1997 | Goyal et al. | ...................... | 703/6 |
| 6,054,997 A * | 4/2000 | Mirtich | .......................... | 345/619 |
| 6,602,070 B2 * | 8/2003 | Miller et al. | ..................... | 433/24 |
| 6,920,374 B2 * | 7/2005 | Takenaka et al. | ............. | 700/245 |
| 7,324,872 B2 * | 1/2008 | Nagasaka | ..................... | 700/245 |

FOREIGN PATENT DOCUMENTS

| | | |
|---|---|---|
| JP | 01-292474 | 11/1989 |
| JP | 02-050269 | 2/1990 |
| JP | 02-122378 | 5/1990 |
| JP | 08-241434 | 9/1996 |
| JP | 10-111955 | 4/1998 |
| JP | 11-086036 | 3/1999 |
| JP | 11-291039 | 10/1999 |
| JP | 2002-352274 | 12/2002 |
| JP | 2003-186390 | 7/2003 |

OTHER PUBLICATIONS

Gilbert et al., A Fast Procedure for Computing the Distance Between Complex Objects in Three-Dimensional Space, IEEE Journal of Robotics and Automation, vol. 4, No. 2, Apr. 1988.*
Graham, R.L., An efficient algorithm for determining the convex hull of a planar set, Inform. Prec. Letters 1 (1972), 132-133.*

(Continued)

*Primary Examiner* — Mary Cheung
*Assistant Examiner* — Jerrah Edwards
(74) *Attorney, Agent, or Firm* — Finnegan, Henderson, Farabow, Garrett & Dunner L.L.P.

(57) ABSTRACT

A contact shape computing apparatus for detecting contact between a plurality of three-dimensional solid models and computing a contact shape between two solid bodies in contact with each other includes the following elements: a collision detector operable to detect a collision or contact between the two solid bodies; a contact plane setting unit operable to define a contact plane that passes through a common region of the two solid bodies; a contact problem solving unit operable to individually solve contact states of the solid bodies with the contact plane as half-contact problems; and a contact shape computing unit operable to compute the contact shape between the two solid bodies by uniting solutions of the half-contact problems for the associated solid bodies, the solutions being obtained by the contact problem solving unit.

24 Claims, 18 Drawing Sheets

OTHER PUBLICATIONS

Graham, R.L. An efficient algorithm for determining the convex hull of a planar set, Inform. Prec. Letters 1 (1972), 132-133.*

Shigematsu et al.; "One solution about the issue of interference between 3-D shape model", Precision instrument, Japan, Journal of the Japan Society for Precision Engineering, vol. 49, No. 11, pp. 1561-1566, (1983).

Hasegawa et al.; "Real time rigid motion simulation based on the contract volume of Polyhedron for tactile interactions", Society of Instrument and Control Engineers, vol. 40, No. 2, pp. 122-131, (2004).

Funaki et al.; "Simplex-Based collision detection to contact force computation between convex polyhedra", Robotics Society of Japan Magazine, Japan. Corporate Judicial Person Robotics Society of Japan, vol. 22, No. 6, pp. 764-771, (2004).

A Japanese Office Action dated Feb. 3, 2009 with English language translation from the Japanese Patent Office in corresponding Japanese Patent application No. 2005-289598.

Hertel et al., "Space-Sweep Solves Intersection of Convex Polyhedra," *Acta Informatica*, 21:501-519, 1984.

Muller et al., "Finding the Intersection of Two Convex Polyhedra," *Theoretical Computer Sci.*, 7:217-236, 1978.

O'Rourke et al., "A New Linear Algorithm for Intersecting Convex Polygons", *Computer Graphics and Image Processing*, 19:384-391, 1982.

van den Bergen, "A Fast and Robust GJK Implementation for Collision Detection of Convex Objects," *Journal of Graphics Tools*, 4(2):7-25, 1999.

* cited by examiner

CONTACT PLANE CP

ORTHOGONAL PROJECTION ONTO CONTACT PLANE CP

POINT TO BE REMOVED

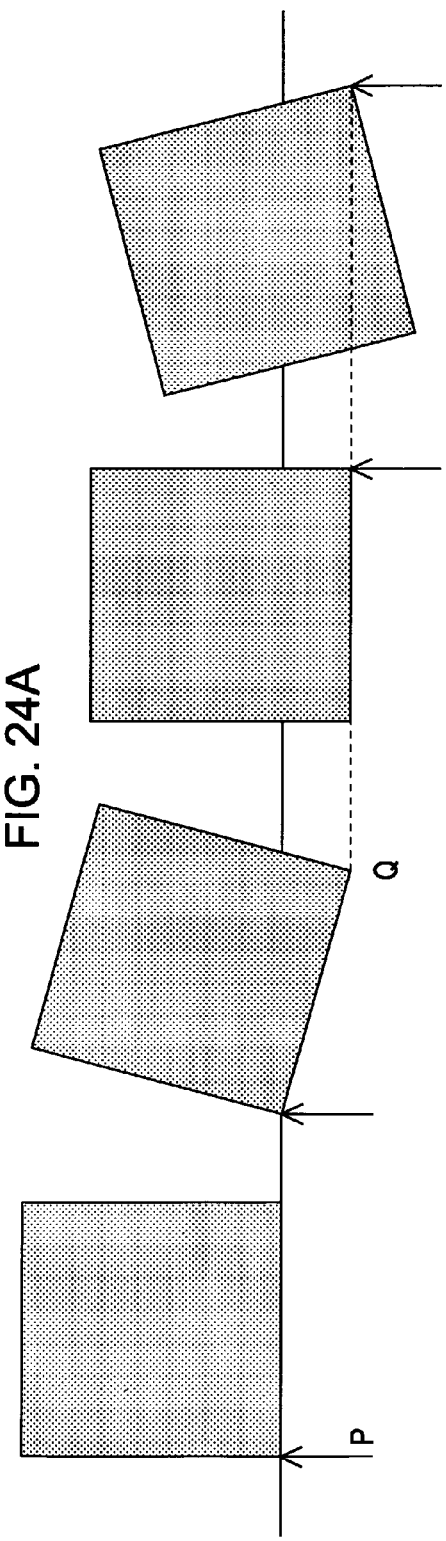
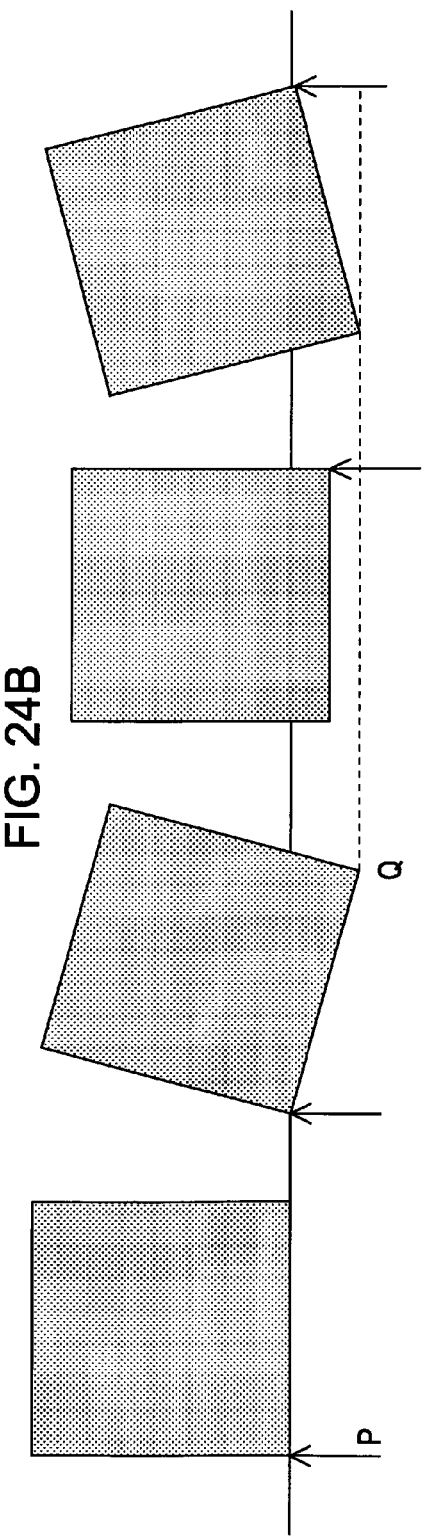

CONTACT SHAPE COMPUTING APPARATUS AND METHOD, AND COMPUTER PROGRAM THEREFOR

CROSS REFERENCES TO RELATED APPLICATIONS

The present invention contains subject matter related to Japanese Patent Application JP 2005-289598 filed in the Japanese Patent Office on Oct. 3, 2005, the entire contents of which are incorporated herein by reference.

BACKGROUND OF THE INVENTION

1. Field of the Invention

The present invention relates to contact shape computing apparatuses and methods and computer programs therefor for detecting contact between a plurality of three-dimensional solid models and computing a contact shape between two solid bodies in contact with each other. More particularly, the present invention relates to a contact shape computing apparatus and method and a computer program therefor for completely and quickly computing a contact polygon between two solid bodies in collision or in contact with each other.

2. Description of the Related Art

Recently, research and development of the structure and stable walking control of legged mobile robots has made advances, and expectations on the practical use of such legged mobile robots have increased. Such legged mobile robots are less stable and have greater difficulty in posture control and walk control than crawler robots, but the legged mobile robots are advantageous in that they can realize flexible walking and running motions such as moving up and downstairs and leaping over obstacles. Proposals have been made for, for example, humanoid robots that have legs serving as moving means and that can generate stable motion patterns in real time for moving from a contact state to a non-contact state.

In many cases, it is necessary for this type of mobile robot to determine a "contact polygon", which is the shape of a region where objects or an object and the robot exert force on each other. With a dynamic simulation representing on a computer physical interactions such as collisions or contacts among a plurality of objects coexisting in a virtual environment, it is necessary to detect a collision occurring between solid bodies and to detect the contact state between the solid bodies, thereby applying an appropriate reaction force to the point of collision.

The zero moment point (ZMP) is employed as a criterion for determining the stability in posture control of legged mobile robots. The ZMP is a point on the floor where the moment due to the floor reaction force is zero (e.g., see Miomir Vukobratovic, "Legged Locomotion Robots" (Ichiro Kato et al., "Hoko robotto to jinkou no ashi (Walking Robots and Artificial Legs)", published by Nikkan Kogyo Shimbun, Ltd.)). If it is possible to conclude, on the basis of the mechanical deduction based on the "d'Alembert's principle" stating that the gravitational and inertial forces acting from the walking system to the floor and their moments are counterbalanced by the floor reaction force serving as the reaction force acting from the floor to the walking system and the floor reaction moment, that the ZMP resides inside a support polygon formed by a sole contact point and the floor, the dynamic consistency of the corresponding motion pattern is ensured. Thus, the posture becomes stable (see. FIG. 19). The posture of the robot becomes more stable when the support polygon corresponding to the posture is larger.

The support polygon is the convex hull, which is the smallest convex polygon including a set of all contact points between the legged robot and the plane floor, and is a concept similar to a contact polygon in collision detection algorithms. In other words, the contact polygon can be applied to the control of legged robots. If the accurate contact polygon between the sole and the floor can be quickly detected, the support polygon can be formed in real time, thereby stabilizing the motion of the legged robot on the floor.

The contact polygon is not limited to a ground polygon on the plane floor. As shown in FIG. 20, when the robot is simultaneously in contact with a plurality of planes with different normal vectors or when the robot is in physical contact with itself (self-interference), it is necessary to accurately detect the contact state to perform more general stabilization and to arrange a complicated motion plan.

For example, as shown in FIG. 21, when two cubes are in contact with each other, it is necessary to apply a reaction force to the vertices A, B, C, and D defining a contact shape. When two solid bodies are in contact with each other, the shape of the contact portion between the two solid bodies, such as the figure ABCD, serves as the contact polygon.

However, many of the known collision detection algorithms can obtain only some of the collision points between two solid bodies and are unable to completely compute the contact polygon. For example, as shown in FIG. 22, the known collision detection algorithms can obtain only one representative point P per collision (which is generally the most penetrating point or the closest point) or, as shown in FIG. 23, a triangular mesh M where the contact is occurring.

Inconvenience is caused when a dynamic simulation is performed directly using the result of an insufficient collision detection algorithm. The case where a cube is placed on a flat floor is examined by way of example. For example, as shown in FIGS. 24A and 24B, in the case where a reaction force is applied only to a representative point P, if the floor reaction force model has no resilience, as shown in FIG. 24A, the cube rotates around the point P and a point Q opposite the point P gradually penetrates through the floor since the point Q is not supported. When the simulation advances one frame, the point Q becomes the most penetrating point, and, instead of the point P, the reaction force is applied to the point Q. As a result, the cube rotates around the point Q, and, this time, the point P penetrates further through the floor. When such situations repeatedly occur, the cube penetrates through the floor without limit. If the floor reaction force model has resilience, as shown in FIG. 24B, although the penetration does not become greater than or equal to a certain amount, the point of application switches between the point P and the point Q, thereby generating vibrations. It is thus difficult to achieve satisfactory simulation results.

The inventors of the present invention consider that such a problem can be solved by computing a perfect contact polygon and applying a reaction force to a group of vertices of the contact polygon. As a method of computing a contact polygon, there is a method of obtaining the intersection between two solid bodies interfering with each other. For example, proposals have been made for a method of computing a reaction force based on the intersection between two solid bodies (for example, see "Rikikaku interaction no tame no tamentai no sesshokutaiseki ni motozuku jitsujikan goutai undou simulation (Real-Time Rigid-Body Motion Simulation based on Contact Volume of Polyhedra for Sense-of-Force Simulation)", The Transactions of the Society of Instrument and Control Engineers, Vol. 40, No. 2, 2004). Also, proposals have been made for a method of computing the intersection between convex solid bodies (for example, see D. E. Muller and F. P. Preparata, "Finding the Intersection of Two Convex Polyhedra", Theoretical Computer Science 7(2), pp. 217-236, 1987, and S. Hertel, K. Mehlhorn, M. Mantyla and J. Nievergelt, "Space Sweep Solves Intersection of Two Convex Polyhedra Elegantly", Acta Informatica 21, pp. 501-519, 1984).

However, all of the above methods perform calculations using all the vertices of two solid bodies interfering with each other, thus involving a large number of calculations. If the shape becomes more complex or the number of objects increases, it may be difficult to perform a simulation in real time.

SUMMARY OF THE INVENTION

It is desirable to provide a satisfactory contact shape computing apparatus and method and a computer program therefor for detecting contact between a plurality of three-dimensional solid models and appropriately computing a contact shape between two solid bodies in contact with each other.

It is also desirable to provide a satisfactory contact shape computing apparatus and method and a computer program therefor for completely and quickly computing a contact polygon between two solid bodies in collision or in contact with each other.

According to a first embodiment of the present invention, there is provided a contact shape computing apparatus for detecting contact between a plurality of three-dimensional solid models and computing a contact shape between two solid bodies in contact with each other. The apparatus includes the following elements: collision detection means for detecting a collision or contact between the two solid bodies; contact plane setting means for defining a contact plane that passes through a common region of the two solid bodies; contact problem solving means for individually solving contact states of the solid bodies with the contact plane as half-contact problems; and contact shape computing means for computing the contact shape between the two solid bodies by uniting solutions of the half-contact problems for the associated solid bodies, the solutions being obtained by the contact problem solving means.

In the field of dynamic simulations, physical interactions such as collisions or contacts among a plurality of objects coexisting in a virtual environment are represented on a computer. In order to apply in real time an appropriate reaction force to the point of collision between solid bodies, it is necessary to quickly compute a more accurate contact polygon between the solid bodies.

However, many of known collision detection algorithms can obtain only some of the collision points between two solid bodies, such as one representative point P per collision (generally the most penetrating point or the closest point) or a triangular mesh M where the contact is occurring, and are unable to completely compute a contact polygon. Inconvenience is caused when a dynamic simulation is performed directly using the result of such an insufficient collision detection algorithm.

As a method of computing a complete contact polygon between solid bodies in collision or in contact with each other, there is a method of computing the intersection between two solid bodies interfering with each other. This method involves a large number of calculations since all the vertices of the two interfering solid bodies are used in calculations. If the shape becomes more complex or the number of objects increases, it may be difficult to perform a simulation in real time.

According to the embodiment of the present invention, an accurate ground polygon is quickly computed by conducting a local search based on a pair of collision representative points (the most penetrating points or the closest points) obtained with a known collision detection algorithm.

Direct handling of the contact state between two solid bodies detected as being in collision or in contact with each other makes the problem more complex since there are various possible combinations. As a result, the computational load is increased. According to the embodiment of the present invention, a contact plane that passes through a common region of the two solid bodies is defined, and contact problems between the solid bodies and the contact plane are individually solved. By uniting the solutions of the contact problems between the solid bodies and the contact plane, a desired contact shape between the two solid bodies can be computed.

Using a known collision detection algorithm, a pair of collision representative points including the closest points or the most penetrating points of two solid bodies in collision or in contact with each other can be detected. According to the embodiment of the present invention, a plane that has a vector connecting the pair of collision representative points of the solid bodies as a normal vector can be defined as the contact plane.

The contact problem solving means may individually compute, as the solutions of the half-contact problems of the associated solid bodies, half-contact polygons describing the contact shapes between the solid bodies and the contact plane. The contact shape computing means may compute the contact shape between the two solid bodies on the basis of a common region of the half-contact polygons computed for the associated solid bodies.

When a search is conducted to determine whether all the vertices of each solid body exist on the contact plane in order to compute the half-contact polygon, the greater the number of vertices of each solid body, the larger the number of calculations involved in the vertex search. According to the embodiment of the present invention, an adjacency graph of the vertices representing the connection relationship among the vertices of each solid body may be used to search for vertices defining the half-contact polygon. Starting from an appropriate vertex on the graph as a starting point, a recursive local search may be conducted on the adjacency graph of the vertices until a vertex that does not exist within the contact plane is reached, thereby computing a set of vertices existing in the half-contact polygon. Since the local search instead of a total search is conducted, the half-contact polygon can be computed quickly with a small number of calculations.

The vertex of a solid body being processed which is the most penetrating through a solid body serving as a contact partner in the normal vector direction may be set as the appropriate starting point. Such a starting point can be computed by, for example, a support mapping in the normal vector direction (or the opposite direction).

A local search may be conducted on the adjacency graph of the vertices, starting from the starting point set as described above, thereby sequentially computing vertices that are nearer to the solid body serving as the contact partner than to the contact plane as vertices existing in the half-contact polygon. When an already-examined vertex or a vertex that exists above the contact plane is reached, it is not necessary to further trace the adjacency graph of the vertices. A set of vertices below the contact plane, which are obtained up to that point, is used as a set of vertices including points on the periphery of the half-contact polygon and a point(s) within the interior of the half-contact polygon.

Generally, the set of vertices obtained by searching the adjacency graph of the vertices in the above-described manner includes a point(s) within the interior of the half-contact polygon. Therefore, the contact problem solving means may remove, among the extracted vertices of the solid body, a redundant point such as the vertex within the interior of the half-contact polygon from the set of vertices. For example, the set of vertices extracted because the vertices exist in the half-contact polygon are orthogonally projected onto the contact plane CP, and an operation is performed to compute a set of vertices of the smallest convex polygon including a group of the orthogonally-projected vertices. As a result, a set of vertices defining the contour of the half-contact polygon, from which an internal point on the contact plane is excluded, can be computed.

In many dynamic simulations, a reaction force is often generated so that solid bodies do not penetrate through each other. In the case of such a non-penetrating model, collision detection of figures generated by expanding the solid bodies by the radius (r) of a sphere may be performed. A half-contact polygon between a plane (offset contact plane) generated by offsetting the contact plane in the normal vector direction and each of the original (unexpanded) solid bodies may be computed, and the intersection of the half-contact polygons computed on the basis of the solid bodies may be computed.

If the original solid bodies do not interfere with each other, a pair of the closest points on the two solid bodies can be computed, instead of a pair of the most penetrating points, as the pair of collision representative points using the known collision detection algorithm. In the non-penetrating model, a contact plane that passes through the midpoint of the pair of the closest points and that has the direction of a straight line connecting the closest points as a normal vector may be defined.

The offset amount r may be determined with various determination methods. It is preferable to set the offset contact plane and each of the original solid bodies to have an intersection point. In such a case, the half-contact polygon of each of the original solid bodies can be computed by setting an offset contact plane by offsetting the contact plane by r toward each of the solid bodies and searching the adjacency graph of the vertices of each of the original solid bodies in the above-described manner.

According to a second embodiment of the present invention, there is provided a computer-readable computer program for executing on a computer system a process for detecting contact between a plurality of three-dimensional solid models and computing a contact shape between two solid bodies in contact with each other. The computer program causes the computer system to execute the steps of: detecting a collision or contact between the two solid bodies; defining a contact plane that passes through a common region of the two solid bodies; individually solving contact states of the solid bodies with the contact plane as half-contact problems; and computing the contact shape between the two solid bodies by uniting solutions of the half-contact problems for the associated solid bodies.

The computer program according to the second embodiment of the present invention defines a computer program written in a computer readable format so as to execute a predetermined process on a computer system. In other words, by installing the computer program according to the second embodiment of the present invention on the computer system, a cooperative operation is performed on the computer system, thereby achieving advantages similar to those of the contact shape computing apparatus according to the first embodiment of the present invention.

According to the embodiments of the present invention, there are provided a superior contact shape computing apparatus and method and a computer program therefor for detecting contact between a plurality of three-dimensional solid models and computing a contact shape between two solid bodies in contact with each other.

According to the embodiments of the present invention, there are provided a superior contact shape computing apparatus and method and a computer program therefor for completely and quickly computing a contact polygon between two solid bodies in collision or in contact with each other.

According to the embodiments of the present invention, an accurate ground polygon can be quickly computed by conducting only a local search based on a pair of collision representative points (the most penetrating points or the closest points) obtained with a collision detection algorithm. Using the computed ground polygon, a fast dynamic simulation can be performed or legged mobile robots can be controlled in a more complex environment.

Further objects, features, and advantages of the present invention will become apparent from detailed description based on the later-described embodiments of the present invention and the appended drawings.

BRIEF DESCRIPTION OF THE DRAWINGS

FIGS. 24A and 24B are diagrams of the results of dynamic simulations of, when a solid body is placed on the flat floor, the application of a reaction force only to a representative point.

DESCRIPTION OF THE PREFERRED EMBODIMENTS

Embodiments of the present invention will be described in detail with reference to the drawings.

A. Method of Computing Contact Polygon

Figure 1:
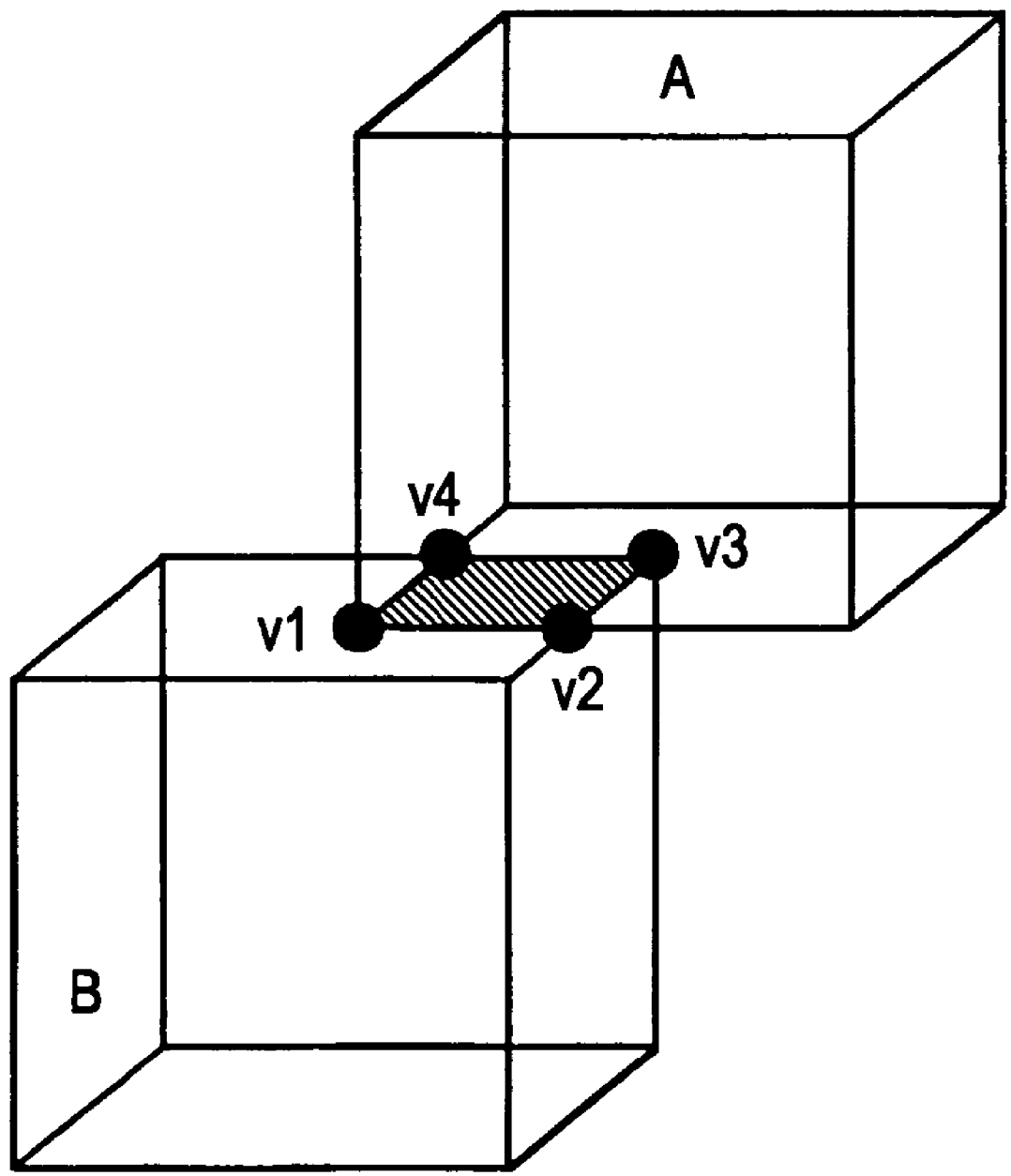
FIG. 1 is a diagram showing two cubes A and B interfering with each other.

The present invention relates to a contact polygon computing method of quickly computing a contact polygon between convex solid bodies in collision or in contact with each other. For the sake of simplification, as shown in FIG. 1, in the case where two cubes A and B are interfering with each other, a method of computing a contact polygon (v1, v2, v3, and v4) will be described by way of example.

Figure 2:
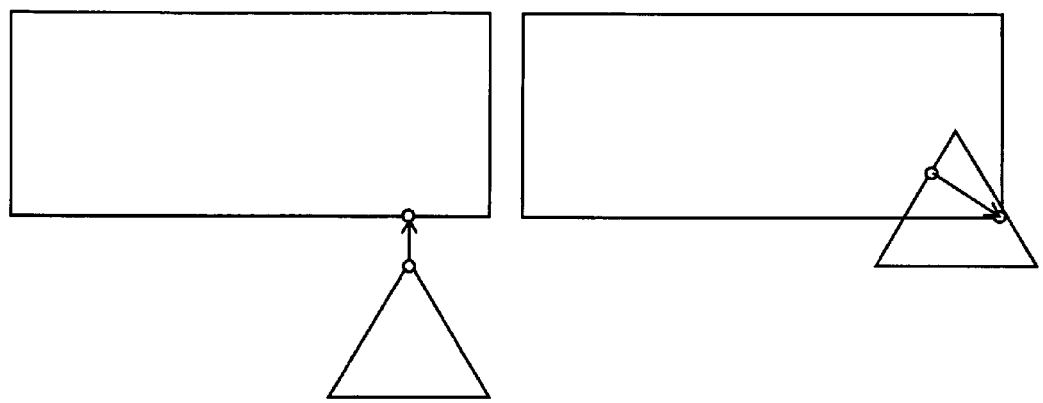
FIG. 2 is a diagram showing the case where collision representative points, such as the closest points or the most penetrating points, between two solid bodies in contact with each other are obtained.

According to an embodiment of the present invention, known collision detection algorithms are applicable for detecting contact between solid bodies. It is assumed that the Gilbert-Johnson-Keerthi distance algorithm (abbreviated as "GJK") is used here as the collision detection algorithm. The GJK is an iterative method of computing the distance between convex figures. As shown in FIG. 2, the GJK algorithm involves obtaining a set of collision representative points such as the closest points or the most penetrating points between two solid bodies and efficiently detecting a collision or contact occurring between the solid bodies.

However, the scope of the present invention is not limited to the GJK algorithm. For the details of the GJK algorithm, for example, see G. van den Bergen, "A Fast and Robust GJK Implementation for Collision Detection of Convex Objects", Journal of Graphics Tools, 4(2), pp. 7-25, 2001.

Figure 3:
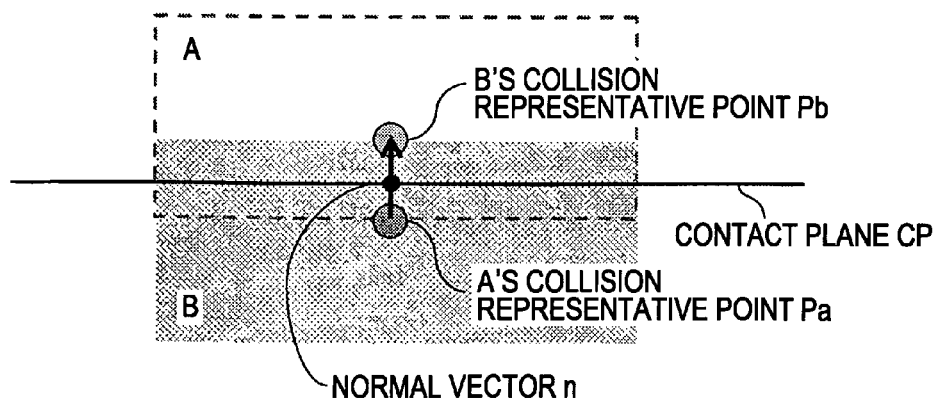
FIG. 3 is an enlarged side view of the contact portion between solid bodies A and B.

FIG. 3 is an enlarged side view of the contact portion between the cubes A and B. It is assumed that, with the above-described collision detection algorithm, a pair of representative points at which contact is occurring between the two cubes A and B in contact with each other (namely, a pair of the most penetrating points) Pa and Pb is computed. In the contact shape computing method according to the embodiment of the present invention, information regarding the pair of collision representative points serves as the starting point, and all vertices v1, v2, v3, and v4 defining the contact polygon are computed.

In a first step of detecting the contact state, a normal vector n of the contact region between solid bodies A and B is prepared. It is generally known that the normal vector n can be satisfactorily approximated as a unit vector connecting the pair of collision representative points Pa and Pb, which is computed as:

$$n=(P_b-P_a)/|P_b-P_a| \quad (1)$$

Further, a plane CP that passes thorough the midpoint of a line segment connecting the pair of collision representative points Pa and Pb and that has "n" as the normal vector is defined, which is referred to as a "contact plane".

Figure 4:
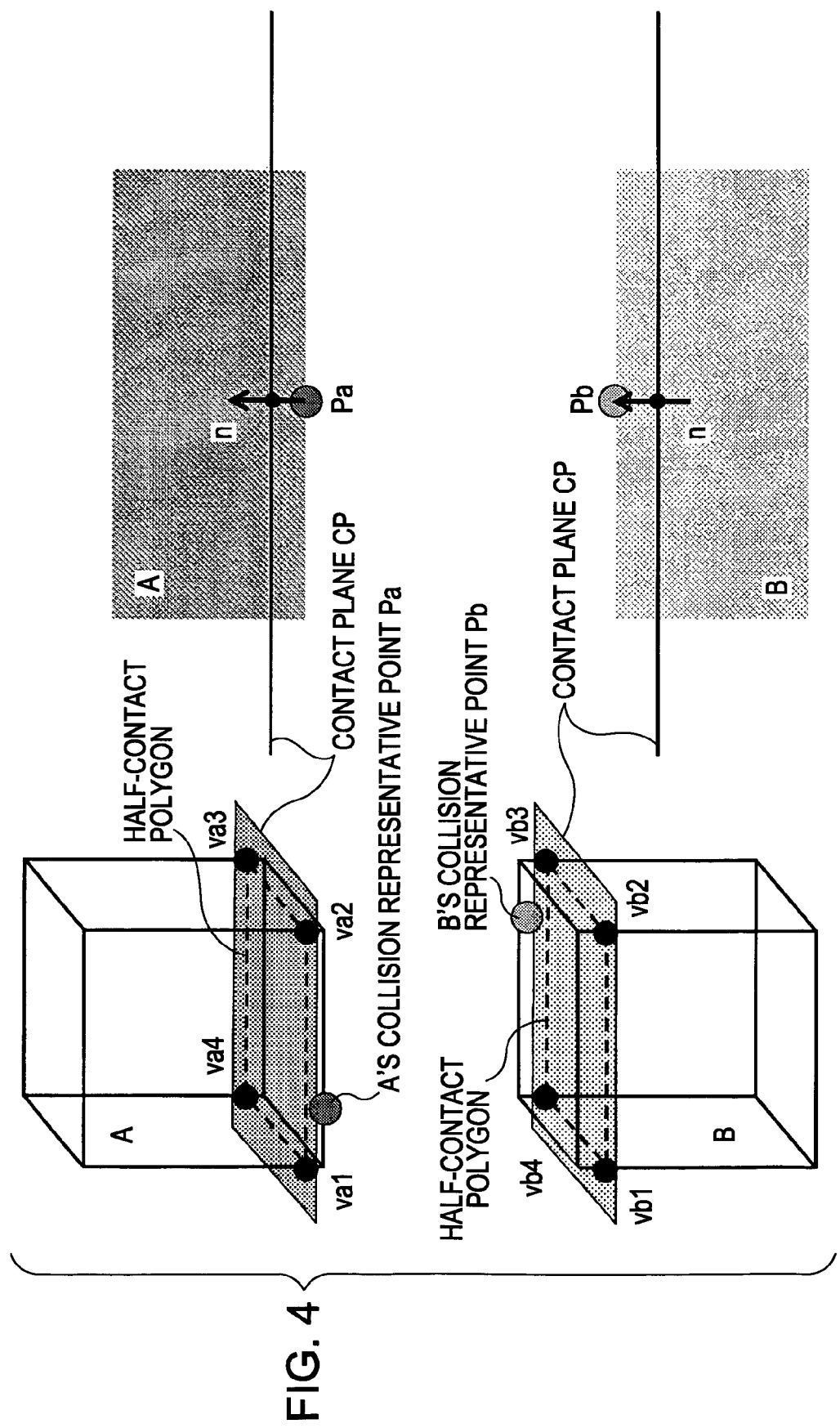
FIG. 4 is a diagram showing the case where a contact problem between the solid bodies A and B is divided into a contact problem between a contact plane CP and one solid body A and a contact problem between the contact plane CP and the other solid body B.

When the contact state between the two solid bodies A and B is directly handled, various combinations are possible, thereby complicating the problem. As a second step of detecting the contact state between the solid bodies A and B, as shown in FIG. 4, this problem is divided into two independent problems, namely, a contact problem between the contact plane CP and one solid body A and a contact problem between the contact plane CP and the other solid body B.

In order to detect the contact state between the plane and a convex solid body, among vertices of the solid body, those existing on the plane are all examined, thereby relatively easily obtaining the shape of the contact surface. That is, as shown in FIG. 4, it is relatively easy to establish a principle for computing the shape of the contact surface between each solid body and the contact plane, namely, (va1, va2, va3, and va4) and (vb1, vb2, vb3, and vb4). In the present specification, a polygon describing the contact shape between each of the solid bodies A and B and the contact plane CP is referred to as a "half-contact polygon".

Actually, however, as described above, when a search is conducted to determine whether all of the vertices of each of the solid bodies A and B exist on the contact plane in order to compute the half-contact polygon, the larger the number of vertices of each solid body, the larger the number of calculations involved in the vertex search. The fact that, the more complex the shape, the slower the speed of computing the contact polygon, is an obstacle to the real-time processing in dynamic simulations and applications to robot control and is thus undesirable.

According to the embodiment of the present invention, a method of quickly computing the half-contact polygon with a small number of calculations by conducting only a local search is employed. The efficiently-packaged collision detection algorithm GJK holds information regarding the collision representative points Pa and Pb of the solid bodies A and B and graphs representing the connection relationships of the surrounding vertices of the solid bodies A and B (namely, "adjacency graphs of the vertices"). A half-contact polygon is configured by computing an appropriate starting point on the adjacency graph of the vertices on the basis of Pa or Pb and by searching, starting from the computed starting point, only part of the adjacency graph of the vertices.

Figure 5:
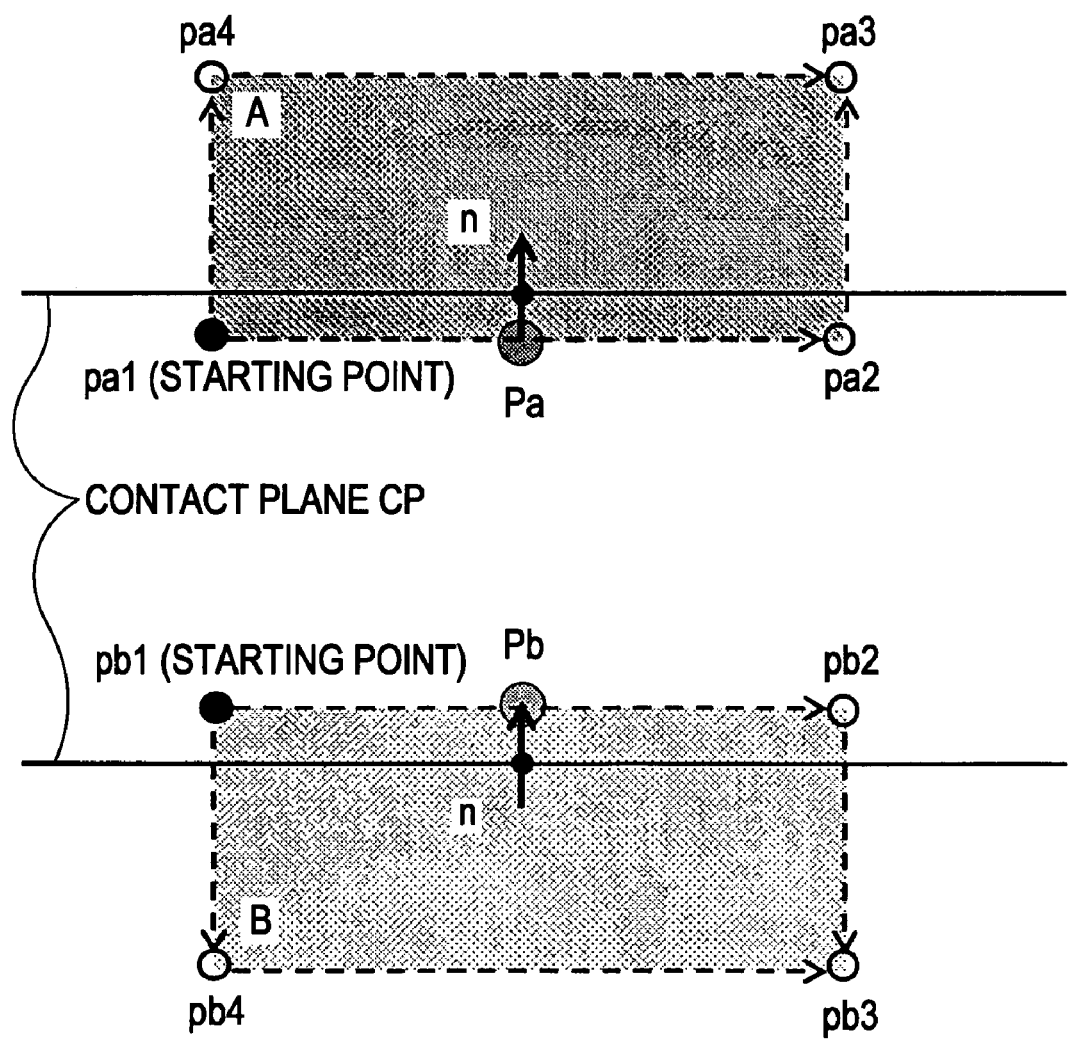
FIG. 5 is a diagram showing representative points Pa and Pb obtained from the solid bodies A and B, respectively, using a collision detection algorithm.
Figure 6:
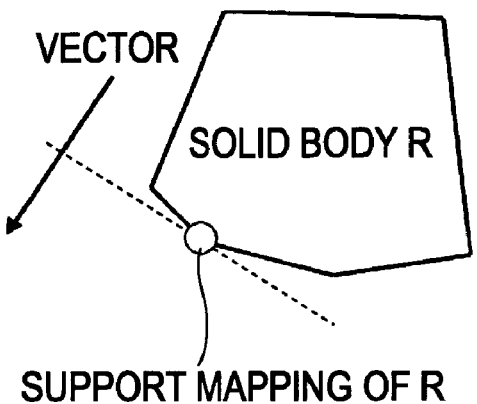
FIG. 6 is a diagram showing a support mapping of a solid body R in a vector direction indicated by the arrow.

As shown in FIG. 5, the representative points Pa and Pb obtained from the solid bodies A and B with the collision detection algorithm do not necessarily exist on the vertices of the solid bodies A and B. Therefore, it is necessary to compute appropriate starting points on the adjacency graphs of the vertices on the basis of the representative points A and B. The appropriate starting points are each obtained by computing a support mapping of each of the solid bodies A and B in the normal vector direction (or the opposite direction). A support mapping is a calculation for obtaining, from among the vertices of a solid body, the most distant vertex (support point) in the direction of a certain vector. FIG. 6 shows the support mapping of a solid body R in a vector direction indicated by the arrow. In the example shown in FIG. 5, the support mapping of the solid body A in a direction opposite to the normal vector is, for example, pa1, and the support mapping of the solid body B in the normal vector direction is, for example, pb1. These points obtained by computing the support mappings serve as the starting points for searching the adjacency graphs of the vertices of the solid bodies A and B.

A support mapping is also used inside the collision detection algorithm (GJK). Using the intermediate result of the collision detection calculation, a support mapping in the normal vector direction can be quickly computed. Since the method of computing a support mapping is not related to the scope of the present invention, for the details of the method, see G. van den Bergen, "A Fast and Robust GJK Implementation for Collision Detection of Convex Objects", Journal of Graphics Tools, 4(2), pp. 7-25, 2001.

Figure 7:
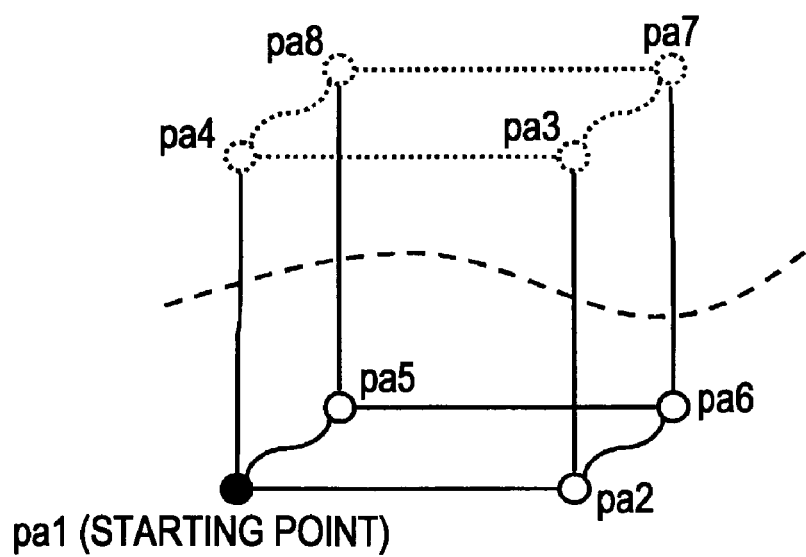
FIG. 7 is a diagram showing the case where a local search is conducted on an adjacency graph of the vertices, starting from an appropriate vertex, to compute a final half-contact polygon between the solid body A and the contact plane.

Next, as has been described above, starting from the vertex obtained from the support mapping in the normal vector direction (or the opposite direction), a search is conducted on each of the adjacency graphs of the vertices of the solid bodies A and B. With reference to FIG. 7, it is determined whether the starting point pa1 is below the contact plane CP. If the starting point pa1 is below the contact plane CP, it is determined that the vertex pa1 is a point existing in the half-contact polygon. Whether a certain vertex x is in the positive region or the negative region of a plane (plane that has the normal vector n and that passes through p) is determined using the following:

when $f(x)=n \cdot (x-p)$, $x$ is in the positive region if $f(x)>0$, otherwise, $x$ is in the negative region (2)

Using the same method, it is determined whether the vertices pa2 and pa4 adjacent to pa1 are below the contact plane. In this manner, the positional relationship between the contact plane and the vertices is examined by recursively tracing the adjacency graph of the vertices. If the tracing reaches an already examined vertex or a vertex existing above the contact plane, it is not necessary to further trace the adjacency graph of the vertices. A set of the vertices below the contact plane, which are obtained up to that point, serves a set of points on the periphery of the half-contact polygon and an internal point(s) within the interior of the half-contact polygon.

A local search on the adjacency graph of the vertices, starting from the vertex obtained from the support mapping in the normal vector direction (or the opposite direction), is an examination of vertices below the contact plane on the adjacency graph of the vertices. Thus, only a small number of vertices are examined, and the computation speed is greatly increased, compared with a procedure for searching for all the vertices of a solid body.

In the example shown in FIG. 7, four points pa1, pa2, pa5, and pa6 are finally obtained as the half-contact polygon describing the contact shape between the solid body A and the contact plane. If the solid body A being processed has a more complex shape and there is a vertex above the vertices pa3, pa4, pa7, and pa8, it can be understood that no further search will be conducted, with the local search on the adjacency graph of the vertices, starting from the appropriate vertex, using the above-described algorithm.

Similarly, with regard to the second contact problem or the contact polygon between the solid body B and the contact plane CP, the vertex pb1 closest to the representative point Pb is computed from a support mapping in the normal direction. Thereafter, starting from pb1, the adjacency graph of the vertices is recursively traced until a vertex existing below the contact plane is reached. In this way, a set of vertices existing above the contact plane CP is obtained only using a local search.

Figure 8:
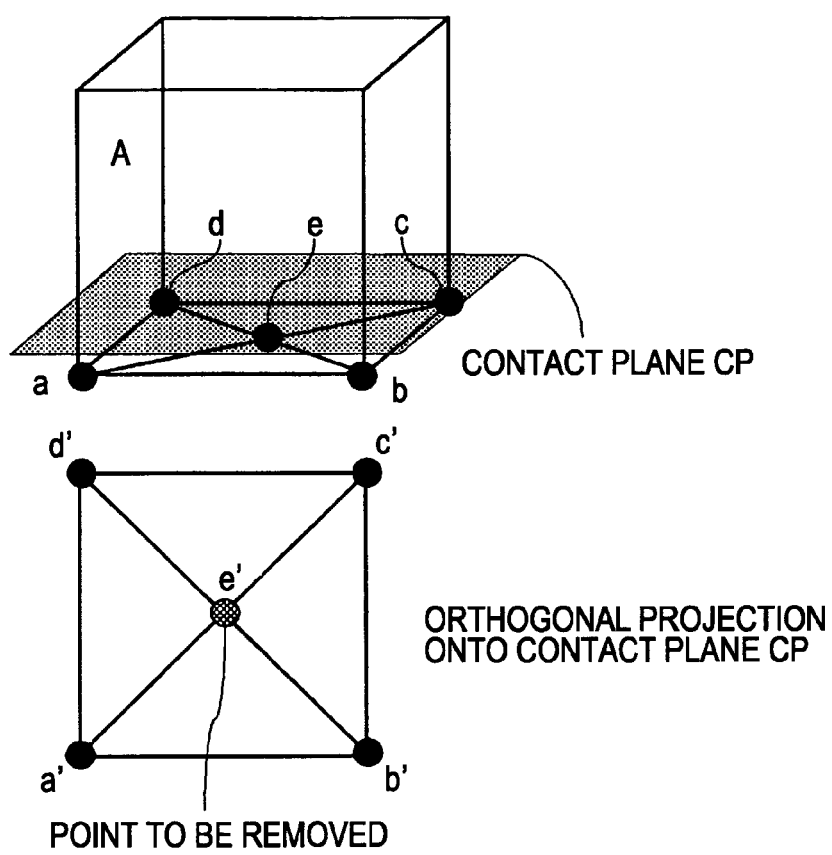
FIG. 8 is a diagram showing the case where a vertex set at the center of a face of a cube is included in the result of the vertex search.

The set of vertices obtained by searching the adjacency graph of the vertices in the above-described manner generally includes a point(s) within the interior of the half-contact polygon. FIG. 8 shows an example where, besides the vertices a, b, c, and d defining a polygon serving as a face of a cube, an additional vertex e is set at the center of the face. In such a case, if the face serves as the contact plane, a set of five vertices (a, b, c, d, and e) is obtained as a result of the above-described vertex search. This set of vertices includes the point e within the interior of the half-contact polygon and is thus redundant.

According to the embodiment of the present invention, as a third step of detecting the contact state between the solid bodies, such a point within the interior of the half-contact polygon is removed from the search result. Specifically, the set of vertices extracted because they exist in the half-contact polygon is orthogonally projected onto the contact plane CP, and a two-dimensional convex hull operation is performed on a group of the orthogonally-projected vertices (a0, b0, c0, d0, and e0). The convex hull operation performed here is an operation for computing a set of vertices of the smallest convex polygon including the set of vertices and can be performed using the Graham scan or the like. For the Graham scan, for example, see Ronald Graham, "An Efficient Algorithm for Determining the Convex Hull of a Finite Planar Set", Information Processing Letters, 1, pp. 132-133, 1972.

As a result of removing the point within the interior of the half-contact polygon from the set of vertices, in the example shown in FIG. 8, a vertex e' is removed, thereby computing the contour (a', b', c', and d') of the half-contact polygon, from which the internal point is excluded. Similarly, for the contact between the solid body B and the contact plane CP, a set of vertices defining the contour of the half-contact polygon, from which an internal point on the contact plane is excluded, is computed.

As a last step, the half-contact polygons of the solid bodies A and B computed in the above-described manner are superimposed on each other, and an overlapping region or the intersection between the two half-contact polygons is computed. This overlapping region serves as the contact polygon between the two solid bodies A and B.

Figure 9:
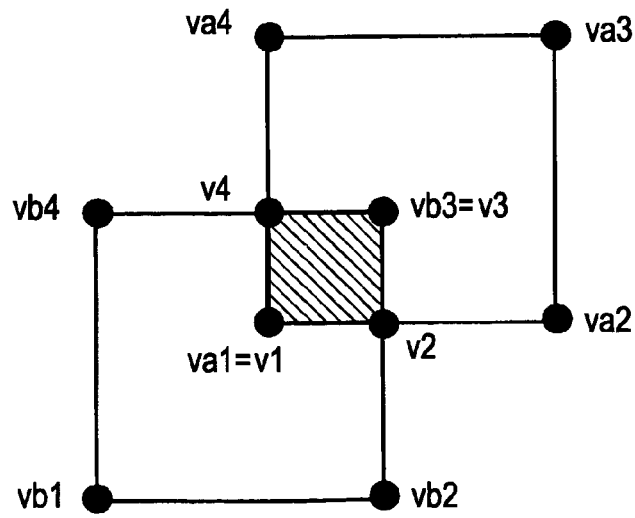
FIG. 9 is a diagram showing the computation of an overlapping region of the half-contact polygons of the solid bodies A and B on the contact plane.

In the example shown in FIG. 4, the half-contact polygons of the solid bodies A and B on the contact plane are, as shown in FIG. 9, (va1, va2, va3, and va4) and (vb1, vb2, vb3, and vb4). Thus, the overlapping region is (v1, v2, v3, and v4). An overlapping region between two two-dimensional polygons can be efficiently computed with, for example, a method described in O'Rourke, et al., "A New Linear Algorithm for Intersecting Convex Polygons", Computer Graphics and Image Processing, 19, pp. 384-391, 1982.

B. Structure and Operation of Apparatus

Figure 10:
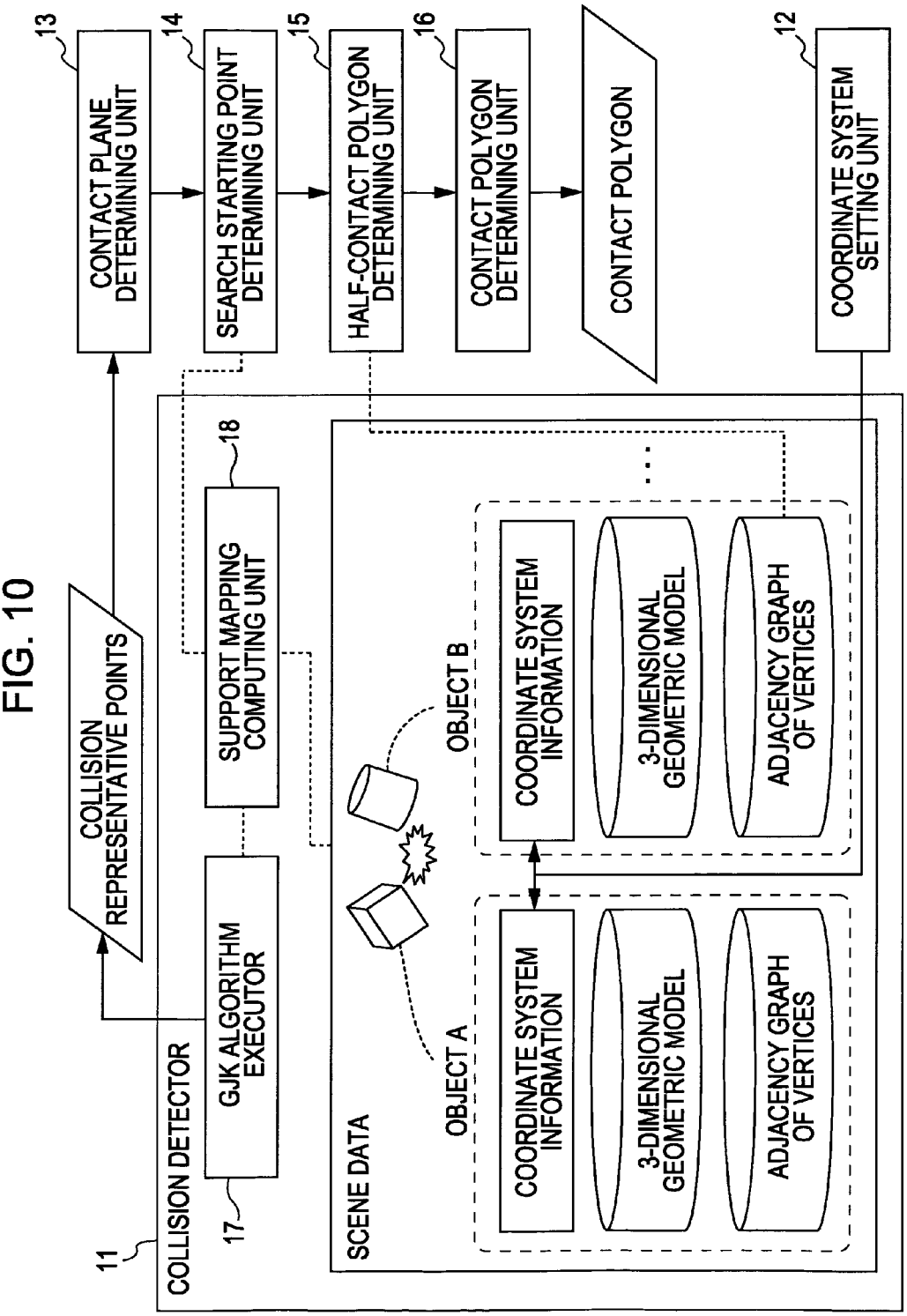
FIG. 10 is a diagram schematically showing the functional structure of an apparatus for realizing a method of computing a contact polygon between solid bodies according to an embodiment of the present invention.

FIG. 10 schematically shows the functional structure of an apparatus for realizing a contact polygon computing method, which has been described above, according to the embodiment of the present invention. A contact polygon computing apparatus shown in FIG. 10 includes a collision detector 11, a coordinate system setting unit 12, a contact plane determining unit 13, a search starting point determining unit 14, a half-contact polygon determining unit 15, and a contact polygon determining unit 16. The components of the apparatus will be described below.

The collision detector 11 is a portion that detects a collision between solid bodies stored on a computer using the GJK algorithm. The collision detector 11 holds scene data and is equipped with functional modules such as a support mapping computing unit 18 and a GJK algorithm executor 17.

The scene data concerns all the solid bodies. That is, the scene data includes information regarding the position and posture in a coordinate system set on each solid body in the world coordinate system (coordinate system information) and information regarding the shape of each solid body. The information regarding the shape is held by, besides data for the vertices and faces (three-dimensional geometric model), keeping an adjacency graph of the vertices representing the connection relationship of the vertices of each solid body. In this way, it can be quickly examined which vertex is connected to which vertex. The coordinate system information is rewritten as necessary by an external coordinate system determining unit (e.g., a dynamic simulation engine or the like) that determines the motion of each solid body.

The support mapping computing unit 18 is a portion that carries out the basic operation for computing, from among the vertices of an arbitrary solid body, the most distant point in the direction of a certain vector, as shown in FIG. 6. Repeatedly using the support mapping computing unit 18, the GJK algorithm executor 17 detects, from among the solid bodies in the scene data, all pairs of two solid bodies in contact or in collision with each other and, for each pair, computes collision representative points (the most penetrating points or the closest points), such as those shown in FIG. 3. The collision detector 11 outputs the result of collision detection, that is, a list of collision representative points for all the collisions.

On the basis of the pairs of collision representative points computed by the collision detector 11, the contact plane determining unit 13 computes a plane that has a vector connecting the representative points as a normal vector and that passes through the midpoint of the representative points as a contact plane.

The search starting point determining unit 14 computes a vertex serving as a search starting point from the adjacency graph of the vertices of each of two solid bodies detected by the collision detector 11 as being colliding with each other. This serves as a preparation for the search operation for computing a half-contact polygon of each of the two solid bodies. The search starting point is computed as a support mapping in the normal direction of the contact plane (or the opposite direction). The support mapping is executed in a more efficient manner by using the execution result obtained by the support mapping computing unit 18 in the collision detector 11.

For each of the two colliding solid bodies, the half-contact polygon determining unit 15 performs a local search on the adjacency graph of the vertices held in the collision-detector 11, starting from the vertex determined by the search starting point determining unit 14, to compute a set of vertices nearer to a solid body serving as a contact partner than to the contact plane. Thereafter, as has been described with reference to FIG. 8, the vertices are orthogonally projected onto the contact plane, and a two-dimensional convex operation is performed on the orthogonally-projected vertices to extract the shape of the contour, thereby determining a half-contact polygon for each of the two solid bodies.

As has been described with reference to FIG. 9, the contact polygon determining unit 16 superimposes the half-contact polygons computed for the two solid bodies by the half-contact polygon determining unit 15 on each other on the contact plane, thereby obtaining the intersection region. The intersection region on the contact plane obtained in this manner is output as the contact polygon representing the shape of the contact portion between the two solid bodies.

The above-described processing is executed for all the pairs of solid bodies detected by the collision detector 11 as being colliding with each other. As a result, accurate contact polygons for all the collisions occurring between the solid bodies in the scene data can be quickly computed.

Figure 11:
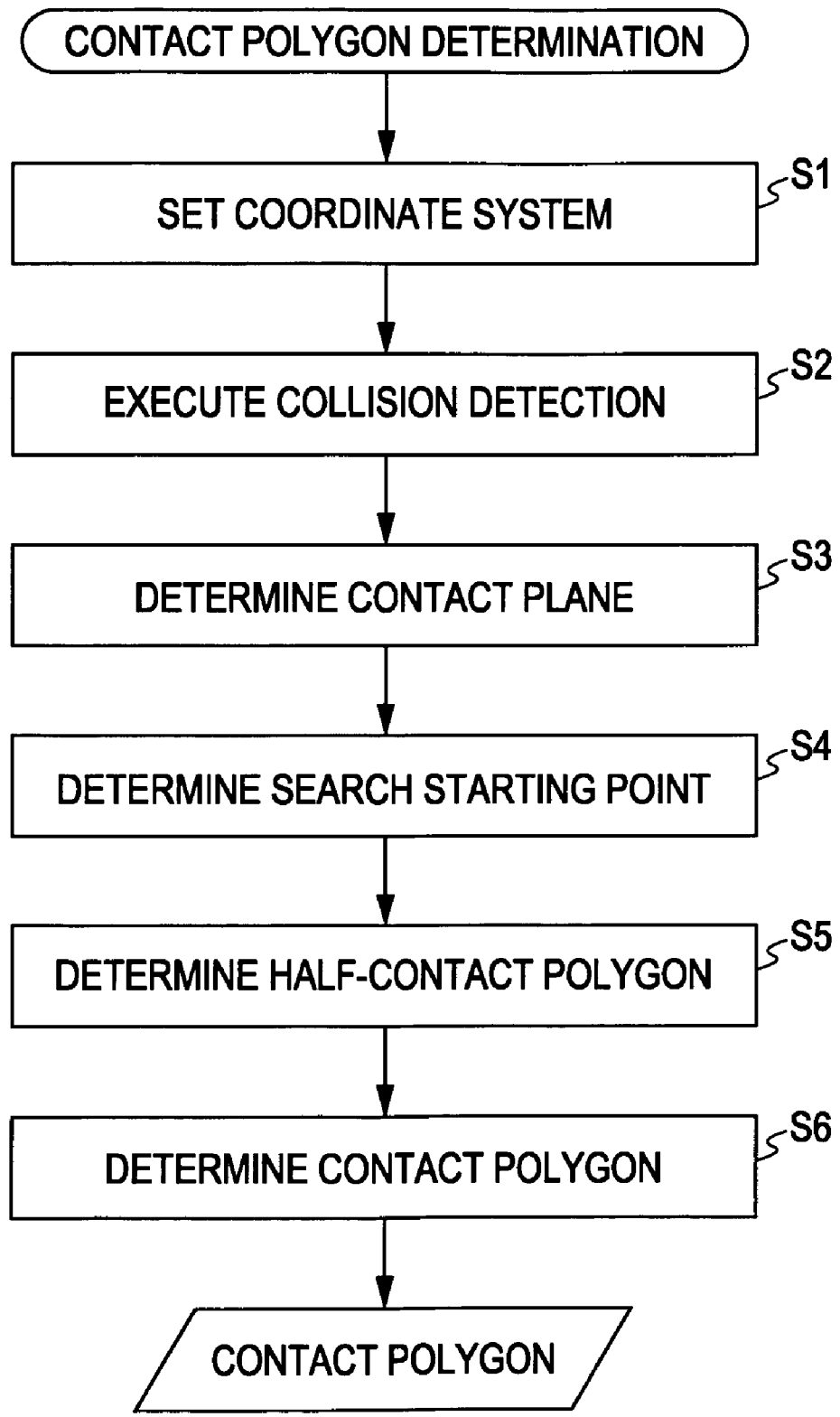
FIG. 11 is a flowchart of a procedure of computing a contact polygon.

FIG. 11 is a flowchart of a procedure for computing a contact polygon, which is executed by the contact polygon computing apparatus shown in FIG. 10. The steps of the procedure will be described below.

In a coordinate system setting step, the position and posture information of each solid body in the scene data is set (step S1).

Next, in a collision detection executing step, all pairs of two solid bodies in contact or in collision with each other in the scene data are computed using the GJK algorithm, and, for each pair, collision representative points (the most penetrating points or the closest points) are computed (step S2).

Next, in a contact plane determining step, a plane that has a vector connecting the collision representative points as a normal vector and that passes through the midpoint of the representative points is defined as a contact plane, and an equation for defining that plane is computed (step S3).

Next, in a search starting point determining step, a starting point for searching for vertices in a half-contact polygon is computed from an adjacency graph of the vertices representing the connection relationship among the vertices of each solid body (step S4). It is appropriate to employ, as the search starting point, the point most penetrating through a solid body serving as a contact partner in the normal vector direction. This is obtained by computing, for example, a support mapping in the normal direction of the contact plane (or the opposite direction).

Next, in a half-contact polygon determining step, a local search is conducted, starting from the determined starting point, on the adjacency graph of the vertices to compute a set of vertices nearer to the collision partner than to the contact plane (step S5). The local search is recursively performed on the adjacency graph of the vertices until a vertex that does not exist within the contact plane, that is, a vertex that exists nearer to the contact plane than to the collision partner, is reached. The obtained vertices are orthogonally projected onto the contact plane, and a two-dimensional convex operation is performed on the orthogonally-projected vertices to extract the shape of the contour, thereby excluding a redundant vertex from the set of vertices and computing a half-contact polygon.

Next, in a contact polygon determining step, the intersection region between the half-contact polygons individually computed for the two solid bodies is computed, and this intersection region is output as a contact polygon (step S6).

Figure 12:
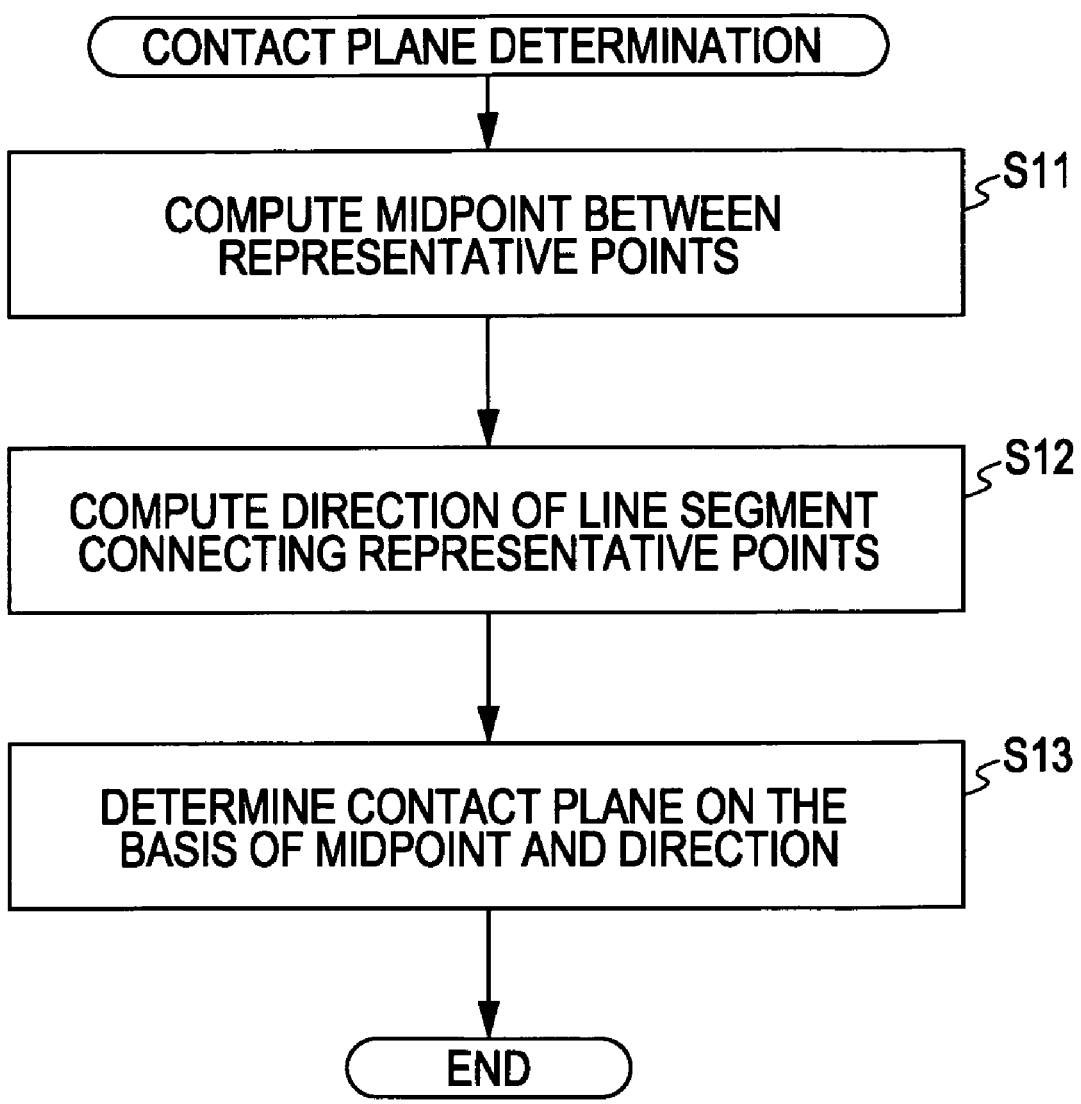
FIG. 12 is a flowchart of a detailed procedure of a contact plane determining step.

FIG. 12 is a flowchart of a detailed procedure of the contact plane determining step.

First, the midpoint of a line segment connecting the above-described collision representative points is computed (step S11).

Next, a vector of the line segment connecting the collision representative points is computed (step S12).

An equation for defining a plane that goes through the midpoint of the representative points, which is computed in step S11, and that has the vector computed in step S12 as the normal vector is computed (step S13), and this plane is output as the contact plane.

When the contact state between two solid bodies detected as being in collision or in contact with each other is directly handled in a dynamic simulation or the like, various combinations are possible, thereby complicating the problem. As a result, the computational load is increased. Therefore, according to the embodiment of the present invention, in the half-contact polygon determining step, the contact plane passing through the common region of the two solid bodies is defined, and contact problems of the solid bodies with the contact plane are individually solved, thereby reducing the computational load and increasing the processing speed.

Figure 13:
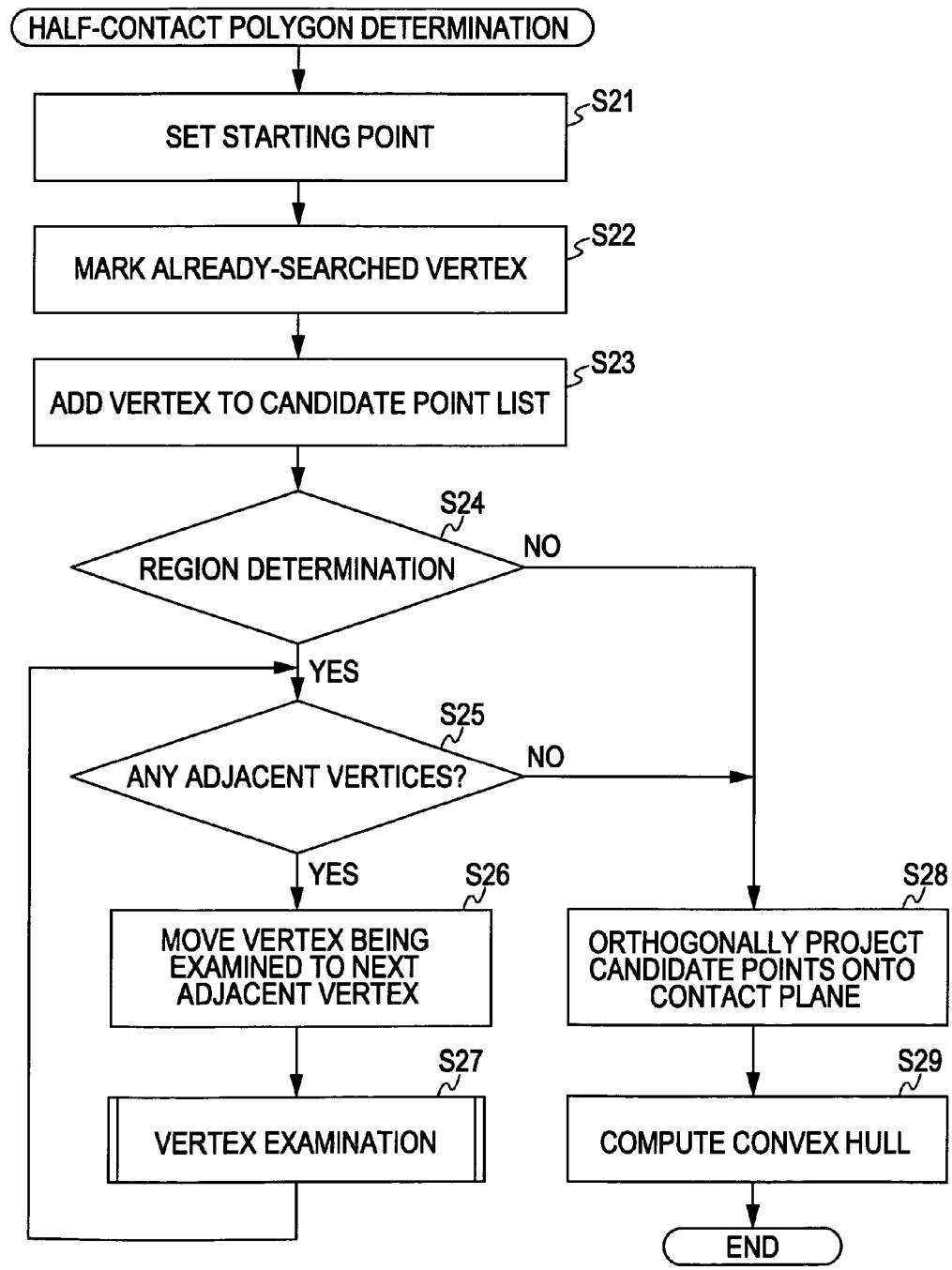
FIG. 13 is a flowchart of a detailed procedure of a half-contact polygon determining step.

FIG. 13 is a flowchart of a detailed procedure of the half-contact polygon determining step.

In the previous step S4, the support mapping in the normal direction of the contact plane (or the opposite direction) is computed to obtain the vertex most penetrating through the solid body serving as the contact partner in the normal vector direction. Thereafter, this vertex is set as a starting point for a local search conducted on the adjacency graph of the vertices (step S21). An already-searched flag is set to the vertex set as the starting point (step S22), and this vertex is added to a candidate point list (step S23). In the subsequent steps, the adjacency graph of the vertices is sequentially traced from the starting point to examine the positional relationship between the contact plane and the vertices.

In step S24, a region determination is performed to determine whether the starting point is nearer to the solid body serving as the contact partner than to the contact plane. The region determination can be performed using the above expressions (2).

If it is determined that the starting point is not nearer to the solid body serving as the contact partner than to the contact plane, it is not necessary to trace the adjacency graph of the vertices. Thus, the further vertex searching is skipped, and the flow jumps to step S28.

In contrast, if the result of the region determination shows that the starting point is nearer to the solid body serving as the contact partner than to the contact plane, it is determined whether vertices adjacent to the starting point are on the adjacency graph of the vertices (step S25). If there are no adjacent vertices, it is not necessary to trace the adjacency graph of the vertices. Thus, the further vertex searching is skipped, and the flow jumps to step S28.

If there are adjacent vertices, the vertex being examined is changed from the starting point to the next adjacent vertex (step S26), and an additionally defined vertex examination is performed (step S27). The vertex examination determines whether a vertex being examined exists in the half-contact polygon. Specifically, a local search is recursively performed on the adjacency graph of the vertices until a vertex that does not exist within the contact plane, that is, a vertex that exists nearer to the contact plane than to the collision partner, is reached, and a set of vertices including points on the periphery of the half-contact polygon and a point(s) within the interior of the half-contact polygon is output.

When the vertex searching ends, the flow returns to step S25. If there are no adjacent vertices to be examined on the adjacency graph of the vertices, the flow proceeds to step S28, and a process of removing a redundant vertex from the computed set of vertices is performed.

Specifically, the redundant vertex is a vertex within the interior of the half-contact polygon (see FIG. 8). In step S28, the set of vertices extracted because they exist in the half-contact polygon is orthogonally projected onto the contact plane CP.

In step S29, a two-dimensional convex operation is performed on a group of the orthogonally-projected vertices on the contact plane to compute a set of vertices of the smallest convex polygon including the set of vertices. The convex operation may be performed using the Graham scan or the like.

As a result of removing the point within the interior of the half-contact polygon from the set of vertices, the contour of the half-contact polygon, from which the redundant point is excluded, is obtained. The half-contact polygon determining process is performed for both of the two objects in contact with each other.

Figure 14:
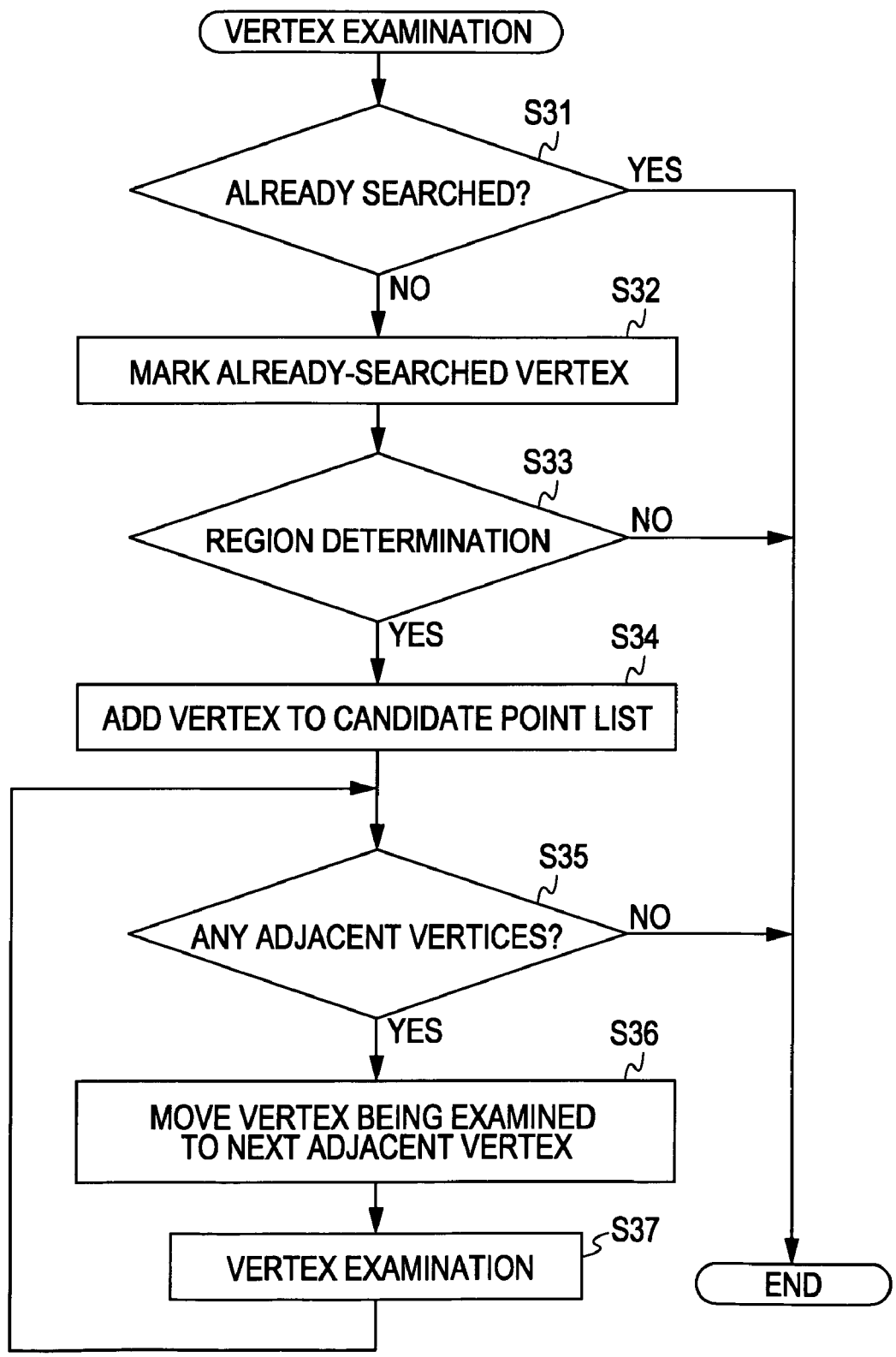
FIG. 14 is a flowchart of a detailed procedure of vertex examination.

FIG. 14 is a flowchart of a detailed procedure of the vertex examination performed in step S27.

It is determined whether the already-searched flag is set to a vertex being examined (step S31).

When the already-examined flag is set to the vertex being examined, it is not necessary to further trace the adjacency graph of the vertices. The candidate point list obtained up to this point is output, and the entire routine of the processing is completed.

If the already-searched flag is not set to the vertex being examined, the already-searched flag is set to the vertex (step S32), and it is determined whether the vertex is nearer to the solid body serving as the contact partner than to the contact plane (step S33). This region determination can be performed using the above expressions (2).

If it is determined that the vertex is not nearer to the solid body serving as the contact partner than to the contact plane, it is not necessary to further trace the adjacency graph of the vertices. The candidate point list obtained up to this point is output, and the entire routine of the processing is completed.

If the result of the region determination shows that the vertex is nearer to solid body serving as the contact partner than to the contact plane, the vertex is added to the candidate point list (step S34).

It is determined whether there are vertices adjacent to this vertex on the adjacency graph of the vertices (step S35). If there are no adjacent vertices, it is not necessary to trace the adjacency graph of the vertices. The candidate point list obtained up to this point is output, and the entire routine of the processing is completed.

If the adjacent vertices are left on the adjacency graph of the vertices, the vertex being examined is changed to the next adjacent vertex (step S36), and the above-described vertex examination is recursively performed on this adjacent vertex (step S37).

C. Application to Non-Penetrating Model

Figure 15:
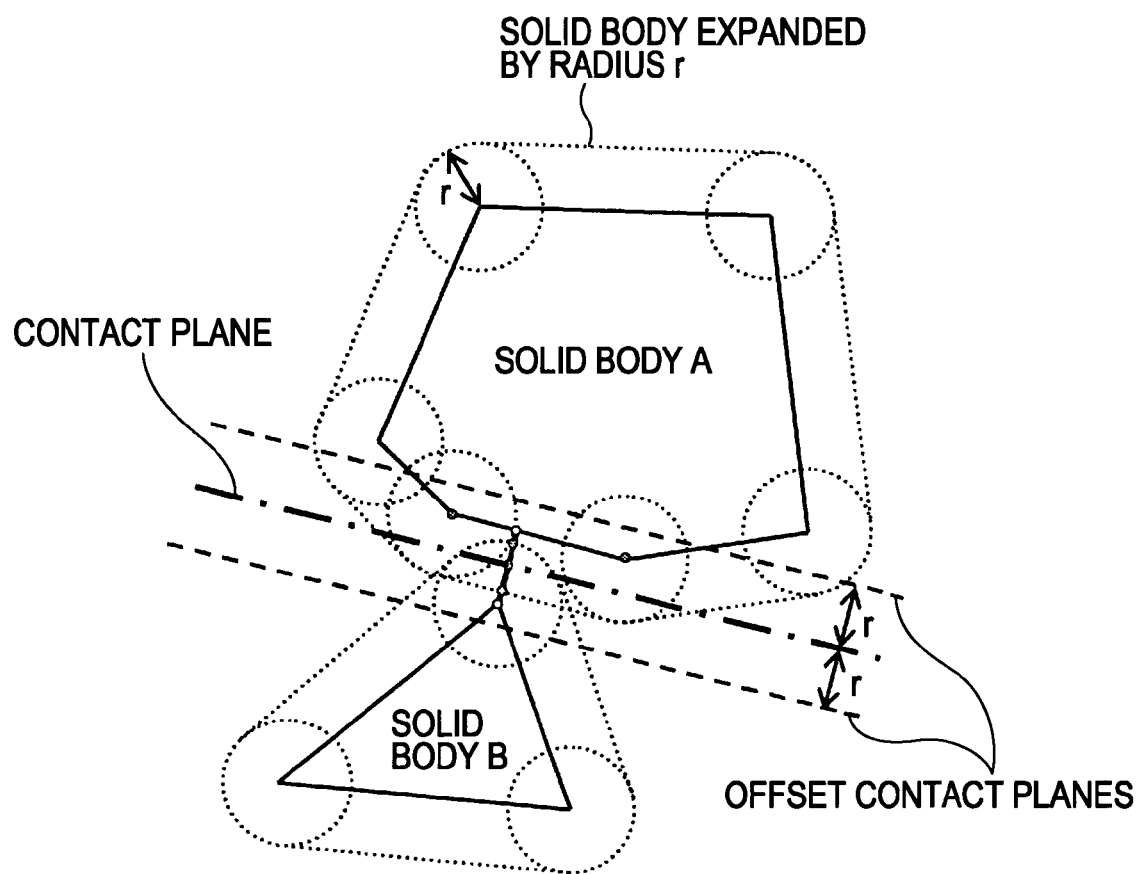
FIG. 15 is a diagram of collision detection performed on figures generated by expanding solid bodies by the radius (r) of a sphere.

For the sake of simplifying the description, the method of computing a contact polygon of a pair of two solid bodies penetrating through each other has been described. However, in many dynamic simulations, (mainly for the sake of efficiency) a reaction force is generated so that the solid bodies do not penetrate through each other. In the case of such a non-penetrating model, as shown in FIG. 15, the Minkowski sum of each solid body and a sphere is computed. That is, collision detection of figures generated by expanding the solid bodies by the radius r of the sphere is performed. A half-contact polygon between a plane (offset contact plane) generated by offsetting the contact plane in the normal vector direction and each of the original (unexpanded) solid bodies is computed, and the intersection between the half-contact polygons is computed.

If the original solid bodies do not interfere with each other, the collision detection algorithm GJK computes, instead of a pair of the most penetrating points, a pair of the closest points of the two solid bodies as a pair of collision representative points. Whereas the penetrating model defines the contact plane as a plane that passes through the common region of two solid bodies, the non-penetrating model defines the contact plane as a plane that passes through the midpoint of the pair of the closest points and that has the direction of a line segment connecting the closest points as a normal vector.

Various methods of determining the offset amount r are possible. It is preferable to set the offset contact plane and the original solid body to have an intersection point. For example, when computing the half-contact polygon with the solid body A, an offset contact plane generated by offsetting the contact plane by r toward the solid body A is used. The determination using the above expressions (2) is performed between the offset contact plane and the vertices of the original solid body A, thereby conducting a search on the adjacency graph of the vertices, as has been described above. Similarly, when computing the half-contact polygon with the solid body B, an offset contact plane generated by offsetting the contact plane by r toward the solid body B, that is, in the direction opposite to the above direction, is used. The other processes such as selecting a vertex serving as a search starting point, removing a point within the interior of the half-contact polygon using a convex hull operation, and computing a common region of the half-contact polygons by computing the intersection may be performed with the same procedures as those in the case of the penetrating model.

In the case of the non-penetrating model, using the same procedure as that shown in FIG. 11, half-contact polygons are individually computed for the original unexpanded solid bodies, thereby computing the contact polygon between the original solid bodies. Because of the expansion, the original solid bodies may not interfere with each other. Thus, the contact plane determination may differ from that shown in FIG. 12.

Figure 16:
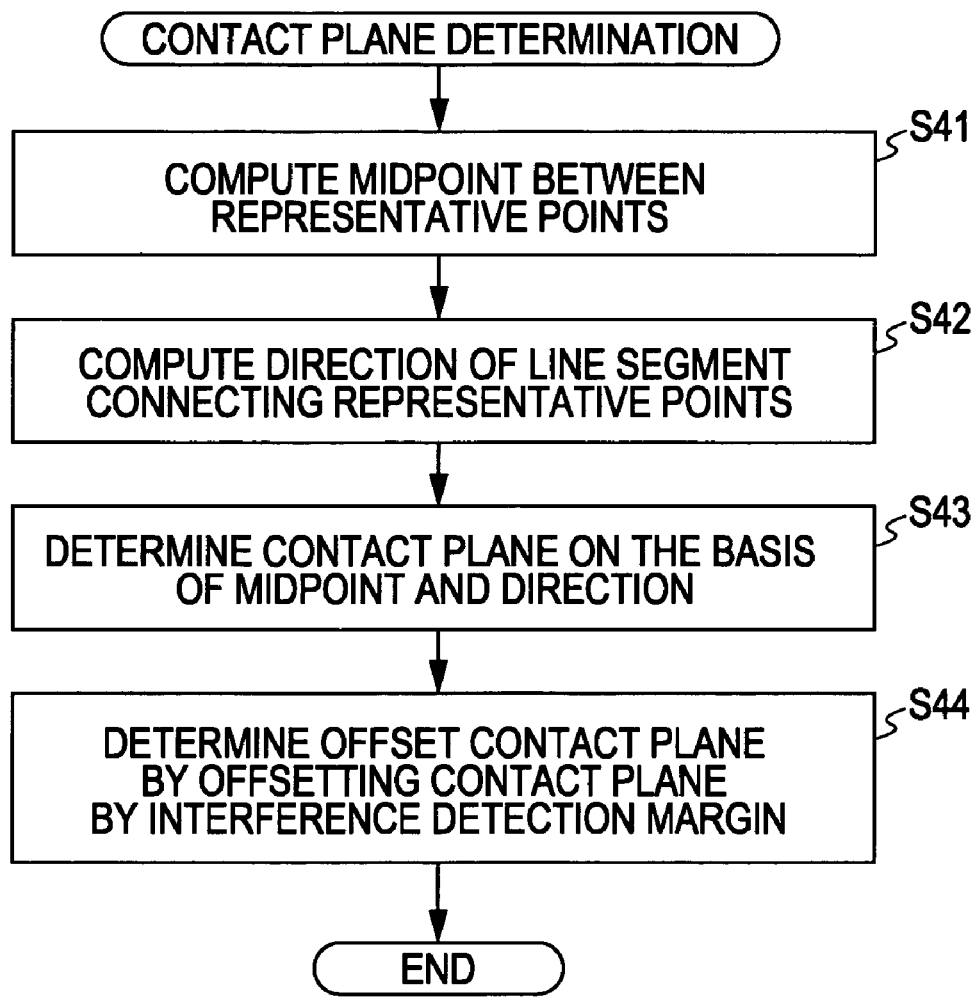
FIG. 16 is a flowchart of a detailed procedure of the contact plane determining step using a non-penetrating model.

FIG. 16 is a flowchart of a detailed procedure of the contact plane determining step using the non-penetrating model.

First, the midpoint of a line segment connecting the closest points of the solid bodies, which are computed as the collision representative points in the collision detection executing step, is computed (step S41).

Next, a vector of the line segment connecting the closest points is computed (step S42).

An equation for defining a plane that passes through the midpoint of the closest points, which is computed in step S41, and that has the vector computed in step S42 as the normal vector is obtained (step S43), and this plane is output as a contact plane.

For each of the solid bodies, the contact plane computed in step S43 is offset in the normal direction to determine an offset contact plane (step S44). Specifically, for each solid body, the contact plane is offset toward itself in the normal direction by the offset amount r, which is used in the collision detection executing step.

D. Applications to Solid Bodies of Other Shapes

Although the method of computing the contact polygon between convex polyhedra has been described above, the scope of the present invention is not limited thereto. For example, the contact polygon between objects of other shapes, such as spheres, circular cylinders, circular cones, or the like can be computed using basically the same procedure.

A point that differs depending on the shape of solid bodies is a method of computing a half-contact polygon between the contact plane and each solid body. It is necessary to prepare a special procedure for each type of solid body.

Figure 17:
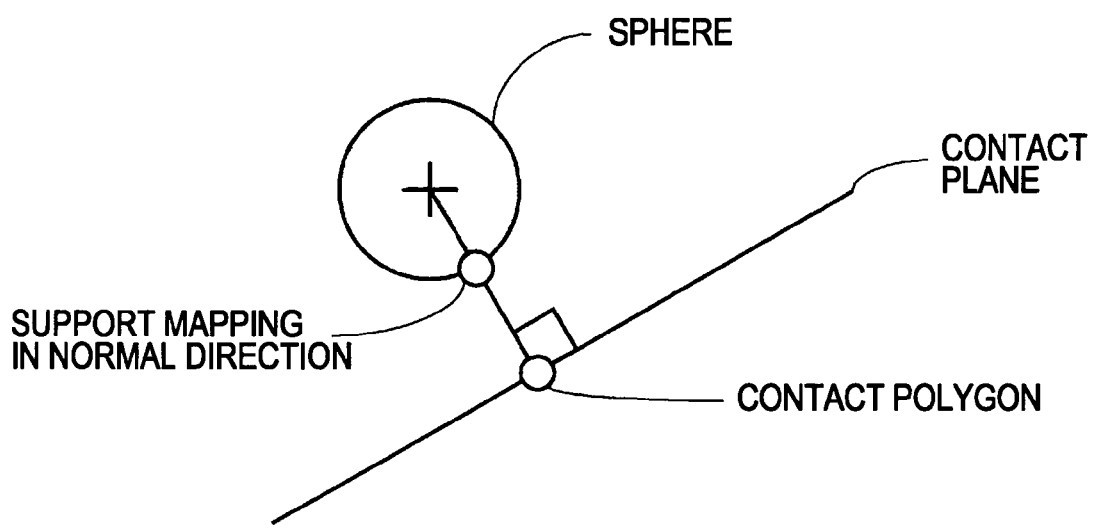
FIG. 17 is a diagram showing the case where, when a sphere is handled as a three-dimensional solid body, a point generated by orthogonally projecting a support mapping in the normal direction of the contact plane onto the contact plane is computed as a half-contact polygon.

In the case of a sphere, the above procedure can be relatively easily applied. For example, as shown in FIG. 17, a point obtained by orthogonally projecting a support mapping in the normal direction of a contact plane onto the contact plane serves as a half-contact polygon.

For the other shapes, half-contact polygons can be relatively easily computed using elementary geometry. In addition, concave shapes can be handled by expressing them as the union of these convex shapes.

E. Application to Dynamic Simulations

Figure 18:
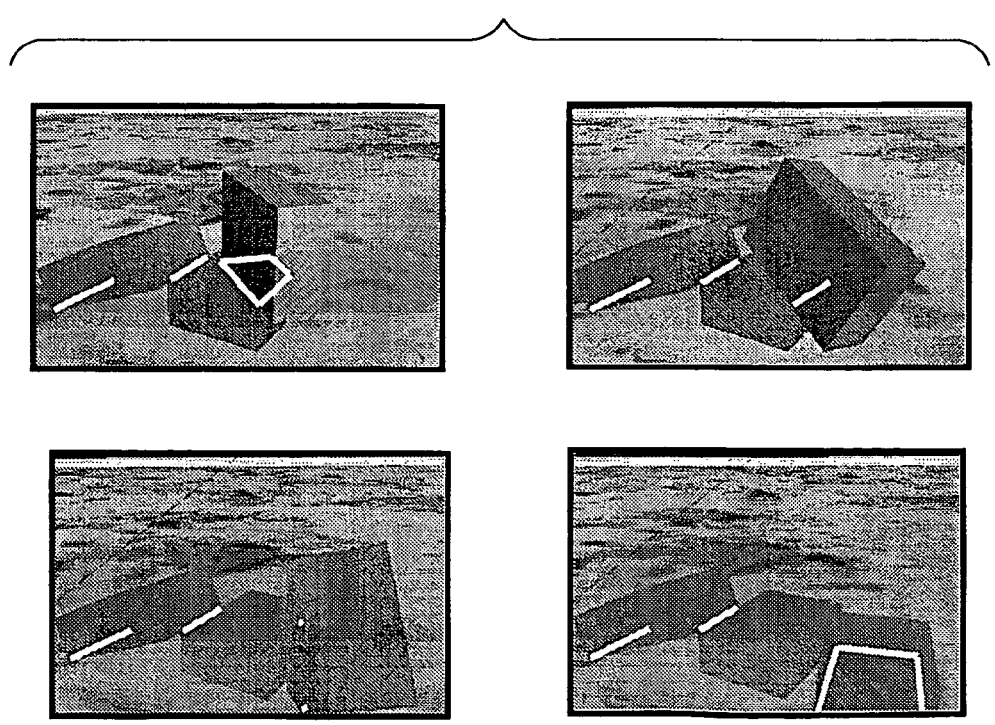
FIG. 18 is a diagram showing the result of a dynamic simulation performed according to the embodiment of the present invention.
Figure 19:
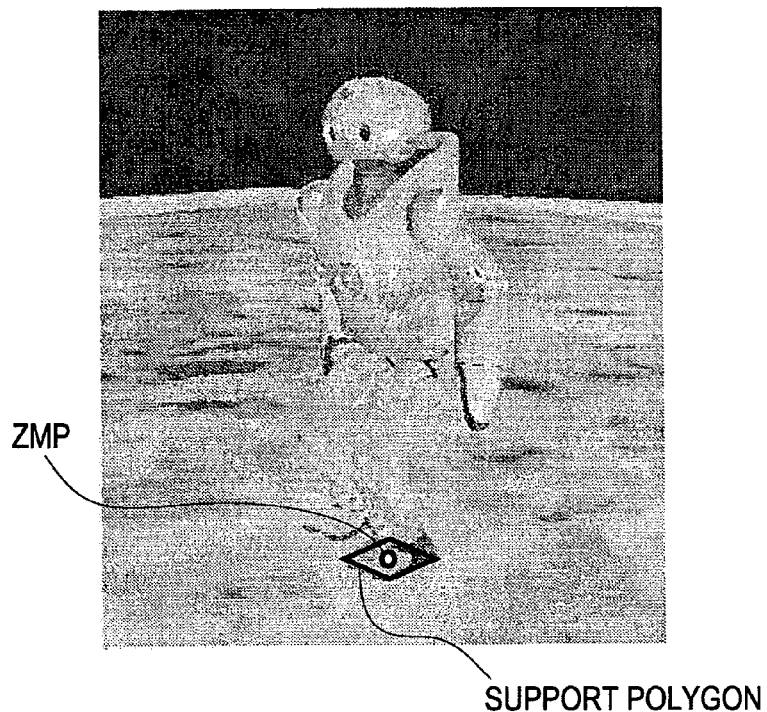
FIG. 19 is a diagram showing the case where a ZMP resides inside a support polygon formed between a sole contact point of a legged robot and the floor.
Figure 20:
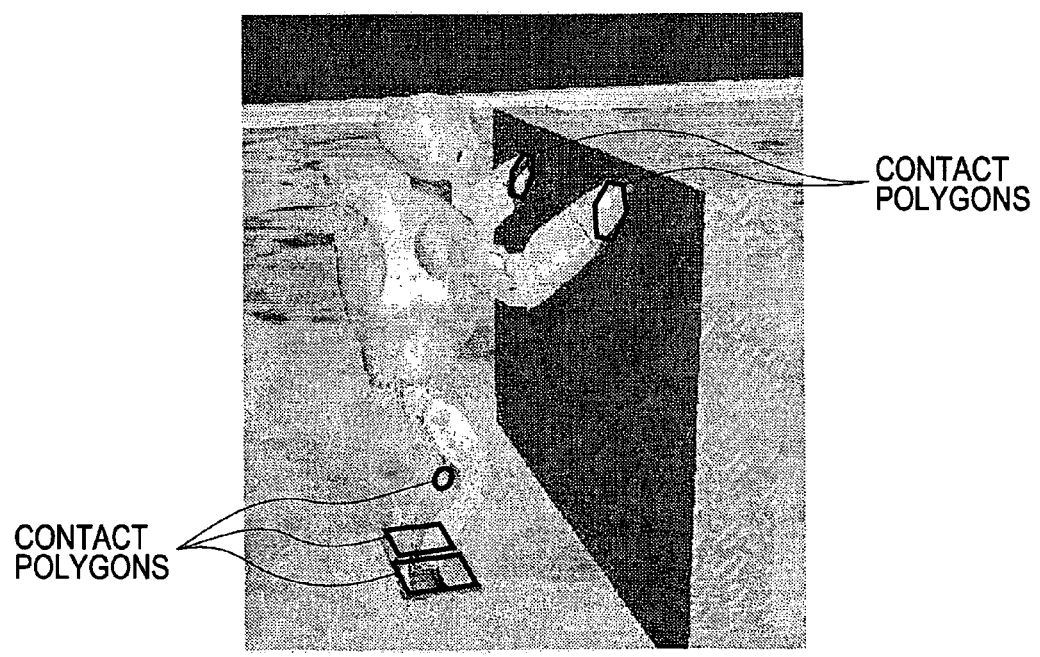
FIG. 20 is a diagram showing the case where the robot is simultaneously in contact with a plurality of planes with different normal vectors and the case where the robot is physically in contact with itself (self-interference)
Figure 21:
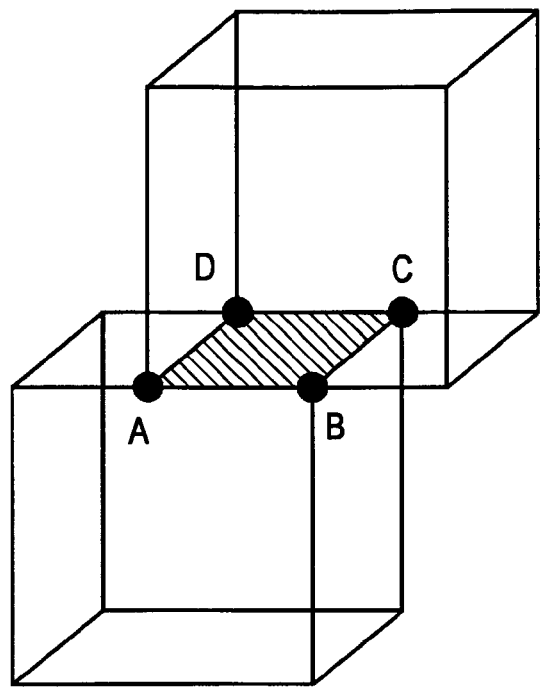
FIG. 21 is a diagram of two cubes in contact with each other at points A, B, C, and D.
Figure 22:
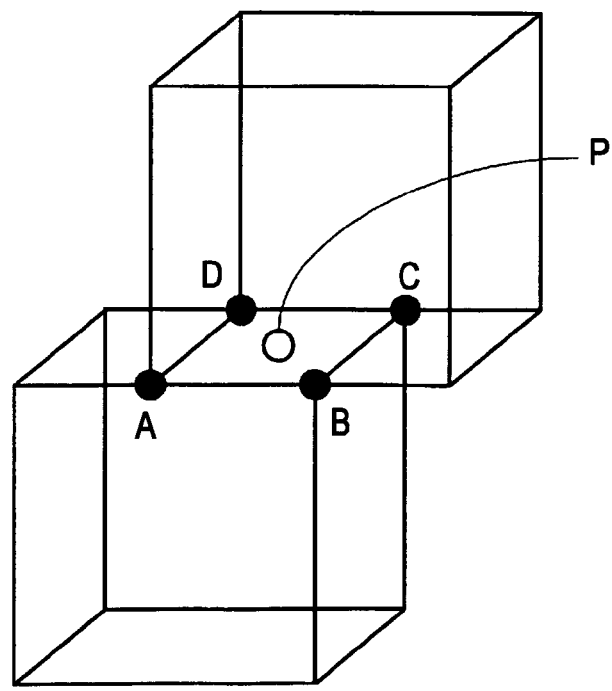
FIG. 22 is a diagram showing the case where a collision or contact between solid bodies is detected as one representative point P per collision (generally the most penetrating point or the closest point)
Figure 23:
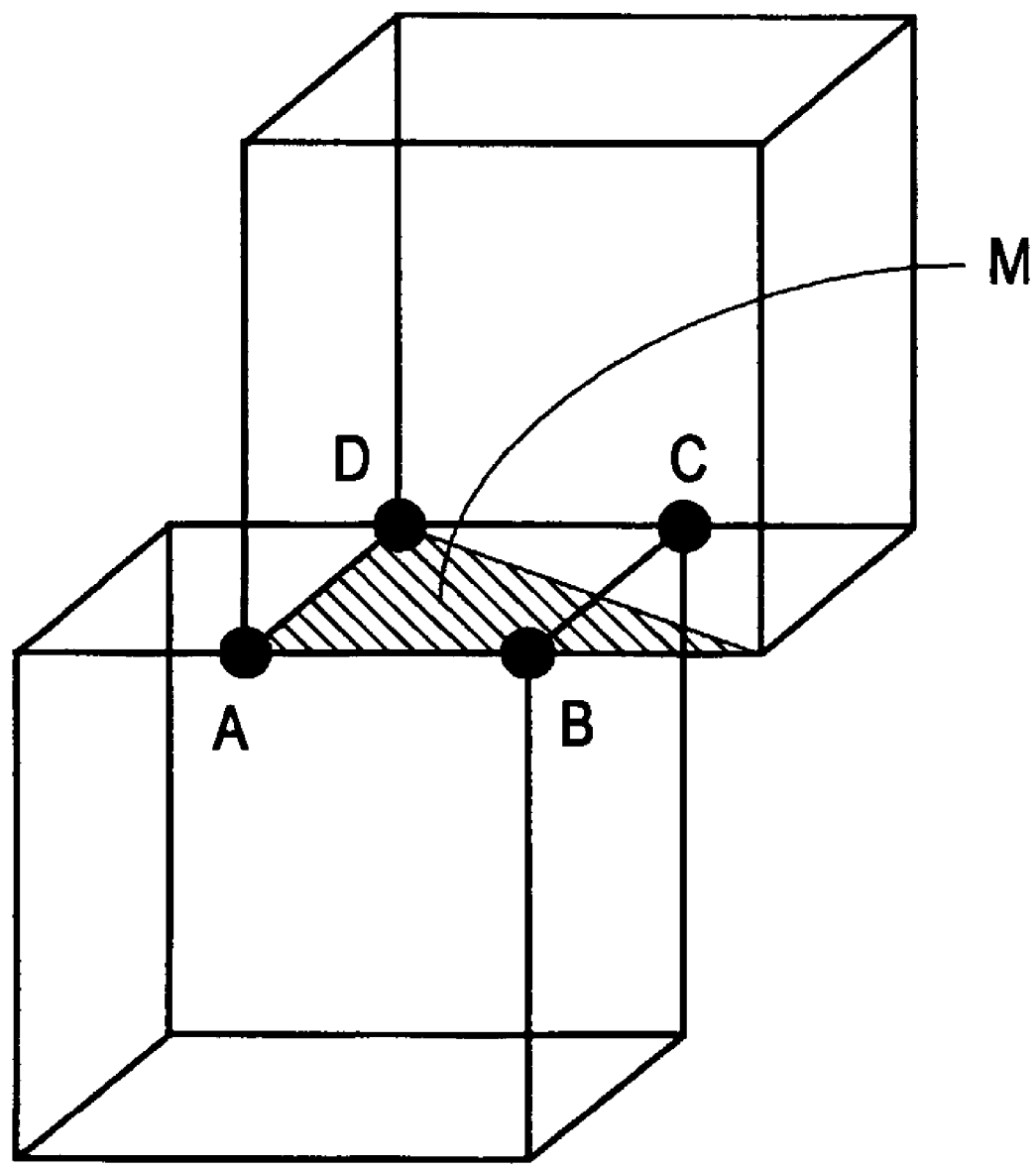
FIG. 23 is a diagram showing the case where a collision or contact between solid bodies is detected as a triangular mesh M where the contact is occurring.

FIG. 18 shows examples of dynamic simulations executed by computing, with the above-described algorithm, a ground polygon of each pair of solid bodies in collision or in contact with each other and applying a reaction force to the vertices of the ground polygon. In FIG. 18, each ground polygon is represented by white lines.

With the algorithm according to the embodiment of the present invention, a ground polygon between two solid bodies in collision or in contact with each other can be more accurately computed. Compared with the case where a force is applied only to collision representative points computed with the collision detection algorithm, the reaction force is simultaneously applied to a plurality of points with a physical basis. Therefore, vibrations are less likely to occur, and a stable dynamic simulation can be executed.

With the algorithm according to the embodiment of the present invention, the ground polygon can be computed by performing only a local search in the vicinity of the collision representative points, without using the vertices defining each solid body. Therefore, a fast simulation can be implemented. That is, a stable and fast dynamic simulation can be implemented.

For example, the ground polygon between the sole of a walking legged robot and the floor is computed in real time, and the ZMP-based posture stability control can be performed. When the robot is simultaneously in contact with a plurality of planes or when the robot is physically in contact with itself, the accurate contact state can be detected in real time, thereby performing more general stabilization and arranging a complicated motion plan.

It should be understood by those skilled in the art that various modifications, combinations, sub-combinations, and alterations may occur depending on design requirements and other factors insofar as they are within the scope of the appended claims or the equivalents thereof.

What is claimed is:

1. A contact shape computing apparatus, comprising:
   a processor; and
   a memory storing computer readable code accessible by the processor for detecting contact between a plurality of three-dimensional solid models and computing a contact shape between two solid bodies in contact with each other, the computer readable code comprising:
   a collision detector configured to detect a collision or contact between the two solid bodies, wherein the collision detector is further configured to detect a pair of collision representative points including the closest points or the most penetrating points of the two solid bodies in collision or in contact with each other;
   a contact plane setting unit configured to define a contact plane that passes through a common region of the two solid bodies, wherein the contact plane setting unit is further configured to define a contact plane that passes through the midpoint of the pair of collision representative points and that has the direction of a line segment connecting the pair of collision representative points as a normal vector;
   a contact problem solving unit configured to individually solve contact states of the solid bodies with the contact plane as half-contact problems, wherein each body has a separate solution to its associated half-contact problem, and the contact problem solving unit is further configured to compute as the solutions of the half-contact problems, half-contact polygons describing the contact shapes between the solid bodies and the contact plane;

a contact shape computing unit configured to compute the contact shape between the two solid bodies by uniting the separate solutions of the half-contact problems for the associated solid bodies, the solutions being obtained by the contact problem solving unit; and a solid body expanding unit configured for generating expanded solid bodies by expanding the plurality of three-dimensional solid models by a predetermined offset amount, wherein the collision detection unit is further configured to detect a collision or contact between the original solid bodies on the basis of a collision or contact between the expanded solid bodies, and the contact problem solving unit is further configured to compute a half-contact polygon between each of the original unexpanded solid bodies and an offset contact plane generated by translating the contact plane; and wherein the solid body expanding unit is configured to set the offset amount so that the offset contact plane and each of the original solid bodies have an intersection point, and the contact problem solving unit is configured to compute a half-contact polygon between each of the original solid bodies and the offset contact plane generated by translating the contact plane in the normal direction by the offset amount toward each of the original solid bodies.

2. The contact shape computing apparatus according to claim 1, wherein an adjacency graph of vertices representing the connection relationship among the vertices of each solid body is held, and for a solid body being processed, the contact problem solving unit searches the adjacency graph of the vertices to compute a set of vertices existing in the half-contact polygon.

3. The contact shape computing apparatus according to claim 2, wherein, for the solid body being processed, the contact problem solving unit recursively conducts a local search on the adjacency graph of the vertices, starting from an appropriate vertex serving as a starting point, until a vertex that does not exist within the contact plane is reached, thereby computing the set of vertices existing in the half-contact polygon.

4. The contact shape computing apparatus according to claim 3, wherein the contact problem solving unit sets, as the starting point, the vertex of the solid body being processed which is the most penetrating through a solid body serving as a contact partner in the normal vector direction.

5. The contact shape computing apparatus according to claim 4, wherein the contact problem solving unit sets, as the starting point, a vertex obtained from a support mapping in the normal vector direction or the opposite direction.

6. The contact shape computing apparatus according to claim 2, wherein the contact problem solving unit extracts, from among the vertices of the solid body being processed, vertices that are nearer to a solid body serving as a contact partner than to the contact plane as the vertices existing in the half-contact polygon.

7. The contact shape computing apparatus according to claim 6, wherein the contact problem solving unit removes, from the set of the extracted vertices of the solid body, a vertex within the interior of the half-contact polygon.

8. The contact shape computing apparatus according to claim 7, wherein the contact problem solving unit orthogonally projects the set of vertices extracted because the vertices exist in the half-contact polygon onto the contact plane and performs an operation to compute a set of vertices of the smallest convex polygon including a group of the orthogonally-projected vertices, thereby computing a set of vertices defining the contour of the half-contact polygon, from which an internal point on the contact plane is excluded.

9. The contact shape computing apparatus according to claim 1, wherein the contact shape computing unit computes the contact shape between the two solid bodies on the basis of a common region of the half-contact polygons individually computed for the solid bodies.

10. The contact shape computing apparatus according to claim 1, wherein the collision detection unit computes a pair of the closest points on the original solid bodies detected as being in collision or in contact with each other, and the contact plane setting unit defines a contact plane that passes through the midpoint of the pair of the closest points and that has the direction of a line segment connecting the pair of the closest points as a normal vector.

11. The contact shape computing apparatus according to claim 1, wherein the contact problem solving unit sets the offset contact plane by translating the contact plane set by the contact plane setting means in the normal vector direction by the offset amount.

12. A contact shape computing method of detecting contact between a plurality of three-dimensional solid models and computing a contact shape between two solid bodies in contact with each other the method performed by a computer system comprising a processor and a memory encoded with program instructions that, when executed by the processor, cause the system to perform the method, the method comprising:

detecting a collision or contact between the two solid bodies, wherein, a pair of collision representative points including the closest points or the most penetrating points of the two solid bodies in collision or in contact with each other is detected;

defining a contact plane that passes through a common region of the two solid bodies, wherein the contact plane passes through the midpoint of the pair of collision representative points and has the direction of a line segment connecting the pair of collision representative points as a normal vector is defined, by the computer system;

individually solving contact states of the solid bodies with the contact plane as half-contact problems, wherein each body has a separate solution to its associated half-contact problem, and half-contact polygons describing the contact shapes between the solid bodies and the contact plane are computed as the solutions of the half-contact problems; and computing the contact shape between the two solid bodies by uniting the separate solutions of the half-contact problems for the associated solid bodies; and generating expanded solid bodies by expanding the plurality of three-dimensional solid models by a predetermined offset amount, wherein, in detecting the collision or contact between the two solid bodies, a collision or contact between the original solid bodies is detected on the basis of a collision or contact between the expanded solid bodies, and in individually solving contact states of the solid bodies with the contact plane as half-contact problems, a half-contact polygon between each of the original unexpanded solid bodies and an offset contact plane generated by translating the contact plane is computed; and wherein in generating expanded solid bodies by expanding the plurality of three-dimensional solid models by a predetermined offset amount, the offset amount is set so that the offset contact plane and each of the original solid bodies have an intersection point, and in individually solving contact states of the solid bodies with the contact plane as half-contact problems, a half-contact polygon between each of the original solid bodies and the offset contact plane generated by translating the contact plane in the normal direction by the offset amount toward each of the original solid bodies is computed.

13. The contact shape computing method according to claim 12, wherein, in individually solving contact states of the solid bodies with the contact plane as half-contact problems, for a solid body being processed, an adjacency graph of vertices representing the connection relationship among the vertices of each solid body is searched to compute a set of vertices existing in the half-contact polygon.

14. The contact shape computing method according to claim 13, wherein, in individually solving contact states of the solid bodies with the contact plane as half-contact problems, for the solid body being processed, a local search is recursively conducted on the adjacency graph of the vertices, starting from an appropriate vertex serving as a starting point, until a vertex that does not exist within the contact plane is reached, thereby computing the set of vertices existing in the half-contact polygon.

15. The contact shape computing method according to claim 14, wherein, in individually solving contact states of the solid bodies with the contact plane as half-contact problems, the vertex of the solid body being processed which is the most penetrating through a solid body serving as a contact partner in the normal vector direction is set as the starting point.

16. The contact shape computing method according to claim 15, wherein, in individually solving contact states of the solid bodies with the contact plane as half-contact problems, a vertex obtained from a support mapping in the normal vector direction or the opposite direction is set as the starting point.

17. The contact shape computing method according to claim 13, wherein, in individually solving contact states of the solid bodies with the contact plane as half-contact problems, from among the vertices of the solid body being processed, vertices that are nearer to a solid body serving as a contact partner than to the contact plane are extracted as the vertices existing in the half-contact polygon.

18. The contact shape computing method according to claim 17, wherein, in individually solving contact states of the solid bodies with the contact plane as half-contact problems, a vertex within the interior of the half-contact polygon is removed from the set of the extracted vertices of the solid body.

19. The contact shape computing method according to claim 18, wherein, in individually solving contact states of the solid bodies with the contact plane as half-contact problems, the set of vertices extracted because the vertices exist in the half-contact polygon is orthogonally projected onto the contact plane, and an operation is performed to compute a set of vertices of the smallest convex polygon including a group of the orthogonally-projected vertices, thereby computing a set of vertices defining the contour of the half-contact polygon, from which an internal point on the contact plane is excluded.

20. The contact shape computing method according to claim 12, wherein, in computing the contact shape between the two solid bodies by uniting solutions of the half-contact problems for the associated solid bodies, the contact shape between the two solid bodies is computed on the basis of a common region of the half-contact polygons individually computed for the solid bodies.

21. The contact shape computing method according to claim 12, wherein in detecting the collision or contact between the two solid bodies, a pair of the closest points on the original solid bodies detected as being in collision or in contact with each other is computed, and in defining the contact plane that passes through a common region of the two solid bodies, a contact plane that passes through the midpoint of the pair of the closest points and that has the direction of a line segment connecting the pair of the closest points as a normal vector is defined.

22. The contact shape computing method according to claim 12, wherein, in individually solving contact states of the solid bodies with the contact plane as half-contact problems, the offset contact plane is set by translating the contact plane set in the contact plane setting step in the normal vector direction by the offset amount.

23. A non-transient computer-readable storage medium comprising program code being operable, when executed by a computer system, to cause the computer system to perform a method for detecting contact between a plurality of three-dimensional solid models and computing a contact shape between two solid bodies in contact with each other, the method comprising the steps of:

detecting a collision or contact between the two solid bodies, wherein, a pair of collision representative points including the closest points or the most penetrating points of the two solid bodies in collision or in contact with each other is detected;

defining a contact plane that passes through a common region of the two solid bodies, wherein the contact plane passes through the midpoint of the pair of collision representative points and has the direction of a line segment connecting the pair of collision representative points as a normal vector is defined;

individually solving contact states of the solid bodies with the contact plane as half-contact problems, wherein each body has a separate solution to its associated half-contact problem, and half-contact polygons describing the contact shapes between the solid bodies and the contact plane are computed as the solutions of the half-contact problems;

computing the contact shape between the two solid bodies by uniting the separate solutions of the half-contact problems for the associated solid bodies; and generating expanded solid bodies by expanding the plurality of three-dimensional solid models by a predetermined offset amount, wherein, in detecting the collision or contact between the two solid bodies, a collision or contact between the original solid bodies is detected on the basis of a collision or contact between the expanded solid bodies, and in individually solving contact states of the solid bodies with the contact plane as half-contact problems, a half-contact polygon between each of the original unexpanded solid bodies and an offset contact plane generated by translating the contact plane is computed; and wherein in generating expanded solid bodies by expanding the plurality of three-dimensional solid models by a predetermined offset amount, the offset amount is set so that the offset contact plane and each of the original solid bodies have an intersection point, and in individually solving contact states of the solid bodies with the contact plane as half-contact problems, a half-contact polygon between each of the original solid bodies and the offset contact plane generated by translating the contact plane in the normal direction by the offset amount toward each of the original solid bodies is computed.

24. A contact shape computing apparatus, comprising:

a processor; and a memory storing computer readable code accessible by the processor for detecting contact between a plurality of three-dimensional solid models and computing a contact shape between two solid bodies in contact with each other, the computer readable code comprising:

a collision detector configured to detect a collision or contact between the two solid bodies, wherein the collision detector is further configured to detect a pair of collision representative points including the closest points or the most penetrating points of the two solid bodies in collision or in contact with each other; and a contact plane setting unit configured to define a contact plane that passes through a common region of the two solid bodies, wherein the contact plane setting unit is further configured to define a contact plane that passes through the midpoint of the pair of collision representative points and that has the direction of a line segment connecting the pair of collision representative points as a normal vector;

a contact problem solving unit configured to individually solve contact states of the solid bodies with the contact plane as half-contact problems, wherein each body has a separate solution to its associated half-contact problem, the contact problem solving unit is further configured to:

compute as the solutions of the half-contact problems, half-contact polygons describing the contact shapes between the solid bodies and the contact plane, and extract, from among the vertices of the solid body being processed, vertices that are nearer to a solid body serving as a contact partner than to the contact plane as the vertices existing in the half-contact polygon; and a contact shape computing unit configured to compute the contact shape between the two solid bodies by uniting the separate solutions of the half-contact problems for the associated solid bodies, the solutions being obtained by the contact problem solving unit; and a solid body expanding unit configured for generating expanded solid bodies by expanding the plurality of three-dimensional solid models by a predetermined offset amount, wherein the collision detection unit is further configured to detect a collision or contact between the original solid bodies on the basis of a collision or contact between the expanded solid bodies, and the contact problem solving unit is further configured to compute a half-contact polygon between each of the original unexpanded solid bodies and an offset contact plane generated by translating the contact plane; and wherein, the solid body expanding unit is configured to set the offset amount so that the offset contact plane and each of the original solid bodies have an intersection point, and the contact problem solving unit is configured to compute a half-contact polygon between each of the original solid bodies and the offset contact plane generated by translating the contact plane in the normal direction by the offset amount toward each of the original solid bodies.

* * * * *